United States Patent
Acharya et al.

(10) Patent No.: US 11,473,838 B2
(45) Date of Patent: Oct. 18, 2022

(54) FLOW MANAGEMENT AND $CO_2$-RECOVERY APPARATUS AND METHOD OF USE

(71) Applicant: General Electric Company, Schenectady, NY (US)

(72) Inventors: Harish Radhakrishna Acharya, Clifton Park, NY (US); Roger Allen Shisler, Ballston Spa, NY (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 413 days.

(21) Appl. No.: 14/974,862

(22) Filed: Dec. 18, 2015

(65) Prior Publication Data
US 2017/0176100 A1 Jun. 22, 2017

(51) Int. Cl.
*F25J 3/08* (2006.01)
*B01D 17/02* (2006.01)
(Continued)

(52) U.S. Cl.
CPC .............. *F25J 3/08* (2013.01); *B01D 17/0211* (2013.01); *B01D 17/0214* (2013.01);
(Continued)

(58) Field of Classification Search
CPC . F25J 3/08; C10G 31/06; C10G 53/02; B01D 53/226; B01D 53/229; B01D 51/10;
(Continued)

(56) References Cited

U.S. PATENT DOCUMENTS

| 4,124,496 | A | * | 11/1978 | Cummings | ............ | F25J 3/0233 |
| | | | | | | 208/361 |
| 5,406,802 | A | * | 4/1995 | Forte | ..................... | C10G 70/06 |
| | | | | | | 62/634 |

(Continued)

OTHER PUBLICATIONS

Stewart et al.,"A study of methods of carbon dioxide capture and sequestration—the sustainability of a photosynthetic bioreactor approach", Energy Conversion and Management, vol. 46, Issue: 3, pp. 403-420, Feb. 2005.

(Continued)

*Primary Examiner* — Frantz F Jules
*Assistant Examiner* — Webeshet Mengesha
(74) *Attorney, Agent, or Firm* — Baker Hughes Patent Organization

(57) ABSTRACT

An apparatus and method for flow management and $CO_2$-recovery from a $CO_2$ containing hydrocarbon flow stream, such as a post $CO_2$-stimulation flowback stream. The apparatus including a flow control zone, a gas separation zone, a pretreatment zone, and a $CO_2$-capture zone. The $CO_2$-capture zone is in fluid communication with the pretreatment zone to provide $CO_2$-capture from a pretreated flowback gas stream and output a captured $CO_2$-flow stream. The $CO_2$-capture zone includes a first $CO_2$-enricher and at least one additional $CO_2$ enricher disposed downstream of the first $CO_2$ enricher and in cascading relationship to provide a $CO_2$-rich permeate stream, the $CO_2$-capture zone further including at least one condenser to condense the enriched $CO_2$-stream and output the captured $CO_2$-flow stream.

8 Claims, 10 Drawing Sheets

(51) Int. Cl.
  *B01D 53/22* (2006.01)
  *C10L 3/10* (2006.01)
  *B01D 19/00* (2006.01)
  *B01D 51/10* (2006.01)
  *B01D 53/26* (2006.01)

(52) U.S. Cl.
  CPC ......... *B01D 19/0068* (2013.01); *B01D 51/10* (2013.01); *B01D 53/22* (2013.01); *B01D 53/226* (2013.01); *B01D 53/229* (2013.01); *C10L 3/104* (2013.01); *B01D 53/268* (2013.01); *B01D 2053/221* (2013.01); *B01D 2256/22* (2013.01); *B01D 2257/304* (2013.01); *B01D 2257/504* (2013.01); *B01D 2257/80* (2013.01); *Y02C 20/40* (2020.08)

(58) Field of Classification Search
  CPC ............ B01D 19/0068; B01D 17/0214; B01D 2053/221; B01D 2256/22; C10L 3/104
  See application file for complete search history.

(56) References Cited

U.S. PATENT DOCUMENTS

| | | | |
|---|---|---|---|
| 6,128,919 A | 10/2000 | Daus et al. | |
| 7,568,363 B2* | 8/2009 | Runbalk | C10G 7/00 62/611 |
| 7,964,020 B2 | 6/2011 | Baker et al. | |
| 8,585,802 B2 | 11/2013 | Keller | |
| 8,628,601 B2 | 1/2014 | Gearhart et al. | |
| 8,696,798 B2* | 4/2014 | Mak | B01D 53/1425 95/172 |
| 8,734,569 B2 | 5/2014 | Hasse et al. | |
| 8,839,875 B2 | 9/2014 | Enis et al. | |
| 8,911,535 B2 | 12/2014 | Kulkarni et al. | |
| 9,115,575 B2 | 4/2015 | Baker et al. | |
| 9,133,700 B2 | 9/2015 | Lissianski et al. | |
| 2008/0127831 A1* | 6/2008 | Rochelle | B01D 3/143 96/181 |
| 2013/0213086 A1* | 8/2013 | Maher | C10L 3/104 62/620 |
| 2014/0134695 A1 | 5/2014 | Zhou et al. | |
| 2015/0210936 A1* | 7/2015 | Burgers | C10G 31/06 208/177 |
| 2016/0279561 A1* | 9/2016 | Burgers | B01D 53/226 |

OTHER PUBLICATIONS

Figueroa et al.,"Advances in CO2 capture technology—The U.S. Department of Energy's Carbon Sequestration Program", International Journal of Greenhouse Gas Control, vol. 2, Issue: 1, pp. 9-20, Jan. 2008.

Falk-Pedersen et al. "Separation of carbon dioxide from offshore gas turbine exhaust", Energy Conversion and Management, ScienceDirect, vol. 38, Supplement, 1997, pp. S81-S86.

\* cited by examiner

FLOW MANAGEMENT AND $CO_2$-RECOVERY APPARATUS AND METHOD OF USE

BACKGROUND

Embodiments disclosed herein relate generally to an apparatus and method of flow management and $CO_2$-recovery from a $CO_2$ containing hydrocarbon flow stream.

Hydraulic fracturing, commonly known as hydro fracturing, or simply fracturing, is a technique used to release petroleum, natural gas or other substances for extraction from underground reservoir rock formations. A wellbore is drilled into the reservoir rock formation, and a treatment fluid is pumped which causes fractures and allows for the release of trapped substances produced from these subterranean natural reservoirs. Current wellhead fracturing systems utilize a process wherein a slurry of fracturing fluid and proppant (e.g. sand) is created and then pumped into the well at high pressure. When water-based fracturing fluids are used, a process referred to as hydro fracturing, the proppant, water and appropriate chemicals can be mixed at atmospheric pressure and then pumped up to a higher pressure for injection into the well. However, if fluids other than water (e.g. liquid $CO_2$ or liquid propane) are used as the fracturing fluid, then these fluids must be kept at a sufficient pressure throughout the hydraulic fracturing system to avoid undesired vaporization. As a result, the blending of these fluids with proppant, chemicals, etc. must also be accomplished while the fluids are kept under a sufficiently high pressure.

$CO_2$-fracturing employs $CO_2$ to replace a significant portion, if not all of the water used in conventional hydrofracturing. The advantage of using $CO_2$ is improved hydrocarbon production through reduced damage to the formation and proppant pack. Additionally, the environmental problems associated with hydrofracturing, such as soil contamination due to top-side fluid spills and use of clean drinking water sources are greatly reduced. Yet several factors limit commercial application. Such factors include cost of $CO_2$, availability of $CO_2$, flaring of $CO_2$-rich hydrocarbon gases and effective proppant transport to name a few. $CO_2$ as a fracturing fluid must be injected at the well site as a supercritical liquid. Typically, $CO_2$-fracturing operations provide that the $CO_2$ utilized for well stimulation is delivered from an external source, stored on site and blended with proppant under pressure.

Wellpad operations after stimulation are typically characterized in two distinct periods: a flowback period and a production period. The flowback period typically lasts between 2 to 4 days. During this period, operations at the well-pad may entail different steps such as millout of the plugs that isolate the various stages in a horizontal well, cleanout of the well-bore of the sand or other solid material, installation of production tubing, etc. The flow from the well during this period is a mix of sand/water/oil/gas and "trash" from the milling out of the plugs. In addition, the flow exhibits high variability in flowrates and compositions including starts/stops as required, accomplishing various tasks in each of the steps.

Subsequent to the flowback period, the responsibility is transferred to the production crew. During the production period, the flow is typically only oil/water/gas with very small amounts of sand, if any, and stable flowrates relative to the flowback period. The pressures during the flowback period are also higher (between 1000 to 2000 psig) compared to those of the production period. More specifically, during the production period pressures are high, typically between 750-1000 psig, and gradually decline over time depending on the well configuration. The flowrates are also relatively stable during this production period as they are mainly dependent only on the well conditions.

After $CO_2$-stimulation, the flowback from a well during the flowback period is characterized by highly variable flowrates and compositions that change significantly over a period of days, e.g. gas flowrates changing from 10-15 million standard cubic feet per day (MMSCFD) to <2MMSCFD while $CO_2$-concentrations change from approximately 100% to 40% over a period of 2 to 4 days. Typically, the $CO_2$-rich flowback during this phase of operations is vented or flared because of the difficulties in designing a process that can keep up with the high variability in the flowrates and gas compositions over a period of 2 of 4 days.

During the production period, which may be from several months to several years, the gas flow rate and $CO_2$-concentration would depend on when the flowback period was terminated and the operating conditions (tubing diameter, pressure, choke strategy) employed. The amount of $CO_2$ in the flowback during the production period from a recovery perspective may be significant only for the first 30 days or so. The gas flowrates during this period would depend on the reservoir characteristics, the $CO_2$-stimulation conditions, the extent of flowback handling during the flowback period, and the flow conditions during the production period. For example, the gas flowrates may change from 2-5 MMSCFD to 1-2 MMSCFD while the $CO_2$-concentrations may change from 70% to 5%. After that initial period, the $CO_2$ present above the sales or pipeline specifications is a nuisance that requires clean up to meet specifications.

Accordingly, there is a need for an improved flow management and $CO_2$-capture system that provides for optimal recovery of $CO_2$ from a $CO_2$ containing hydrocarbon flow stream, such as a post $CO_2$-stimulation flowback, for reuse. Optimal recovery of the $CO_2$ is sought at desired specifications in keeping with equipment costs, footprint occupied at the wellpad, ease of commission, use, decommission and emission compliance.

BRIEF SUMMARY

These and other shortcomings of the prior art are addressed by the present disclosure, which provides an apparatus and method of recovering $CO_2$ from a a $CO_2$ containing hydrocarbon flow stream, such as a flowback after well-stimulation with $CO_2$-rich fluids.

In accordance with an embodiment, provided is an apparatus for flowback management and $CO_2$-recovery of a $CO_2$ containing hydrocarbon flow stream. The apparatus including a flow control zone, a gas separation zone, a pretreatment zone and a $CO_2$-capture zone. The flow control zone is in fluid communication with the $CO_2$ containing hydrocarbon flow stream to provide control of a flowrate of the $CO_2$ containing hydrocarbon flow stream and output a modified $CO_2$ containing hydrocarbon flow stream. The gas separation zone is in fluid communication with the modified $CO_2$ containing hydrocarbon flow stream to provide separation of a gas from the modified $CO_2$ containing hydrocarbon flow stream and output a $CO_2$ containing hydrocarbon process stream. The pretreatment zone is in fluid communication with the gas separation zone to provide removal of one or more of trace solids, aerogels, oil, hydrogen sulfides, water and non-gas liquids from the $CO_2$ containing hydrocarbon process stream and output a pretreated gas stream. The $CO_2$-capture zone is in fluid communication with the pretreatment zone to provide $CO_2$-capture from the pretreated gas stream and output a captured $CO_2$-flow stream. The $CO_2$-capture zone includes a first $CO_2$-enricher and at least one additional $CO_2$-enricher disposed downstream of the first $CO_2$-enricher and in cascading relationship to provide a $CO_2$-rich permeate stream. The $CO_2$-capture zone further includes at least one condenser to condense the enriched $CO_2$-stream and output the captured $CO_2$-flow stream.

In accordance with another embodiment, provided is an apparatus for flowback management and $CO_2$-recovery of a post $CO_2$-stimulation flowback stream. The apparatus including a flow control zone, a gas separation zone, a pretreatment zone and a $CO_2$-capture zone. The flow control zone is in fluid communication with the post $CO_2$-stimulation flowback stream to provide control of a flowrate of the post $CO_2$-stimulation flowback stream and output a modified flowback stream. The gas separation zone is in fluid communication with the modified flowback stream to provide separation of a gas from the modified flowback stream and output a flowback process stream. The pretreatment zone is in fluid communication with the gas separation zone to provide removal of one or more of trace solids, aerogels, oil, hydrogen sulfides, water and non-gas liquids from the flowback process stream and output a pretreated flowback gas stream. The $CO_2$-capture zone is in fluid communication with the pretreatment zone to provide $CO_2$-capture from the pretreated flowback gas stream and output a captured $CO_2$-flow stream. The $CO_2$-capture zone includes a first $CO_2$-enricher and at least one additional $CO_2$-enricher disposed downstream of the first $CO_2$-enricher and in cascading relationship to provide a $CO_2$-rich permeate stream. The $CO_2$-capture zone further includes at least one condenser to condense the enriched $CO_2$-stream and output the captured $CO_2$-flow stream.

In accordance with another embodiment, provided is an apparatus for flowback management and $CO_2$-recovery from a post $CO_2$-stimulation flowback stream. The apparatus including a flowback processing unit, a pretreatment unit and a $CO_2$-capture zone. The flowback processing unit receives and processes the post $CO_2$-stimulation flowback stream and outputs a modified flowback stream at desired pressure and temperature. The pretreatment unit receives and removes contaminants from the modified flowback stream and outputs a pretreated flowback stream. The $CO_2$-capture zone is in fluid communication with the pretreatment zone to provide $CO_2$-capture from the pretreated flowback gas stream and output a captured $CO_2$-flow stream. The $CO_2$-capture zone includes a flow splitter to direct the pretreated flowback gas stream to a first $CO_2$-enricher and at least one additional $CO_2$-enricher disposed downstream of the first $CO_2$ enricher and in cascading relationship to provide a $CO_2$-rich permeate stream. The $CO_2$-capture zone further including at least one condenser to condense the enriched $CO_2$-stream and output the captured $CO_2$-flow stream.

In accordance with yet another embodiment, provided is a method of flowback management and $CO_2$-recovery from a post $CO_2$-stimulation flowback stream. The method including processing a post $CO_2$-stimulation flowback stream to yield a modified flowback stream at a desired pressure and temperature, pretreating the modified flowback stream to remove one or more contaminants and output a pretreated flowback stream, directing the pretreated flowback stream to a first compressor and a first $CO_2$-enricher disposed downstream of the first compressor, the first $CO_2$-enricher outputting a $CO_2$-rich permeate stream and a $CO_2$-lean retentate stream, directing the $CO_2$-lean retentate stream to at least one additional $CO_2$-enricher and at least one additional compressor disposed downstream of the at least one additional $CO_2$-enricher, the at least one additional $CO_2$-enricher outputting a partially enriched $CO_2$ permeate stream to mix with the pretreated flowback stream upstream of the first compressor, condensing the enriched CO2 flow stream in a condenser disposed downstream of the first CO2 enricher, the condenser outputting a captured $CO_2$-flow stream and transferring the captured $CO_2$-flow stream as a $CO_2$-product stream for product end use.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

This disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Preferred embodiments of the present disclosure are illustrated in the figures with like numerals being used to refer to like and corresponding parts of the various drawings. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" and "approximately" used in connection with a quantity is inclusive of the stated value and has the meaning dictated by the context (e.g., includes the degree of error associated with measurement of the particular quantity).

Figure 1:
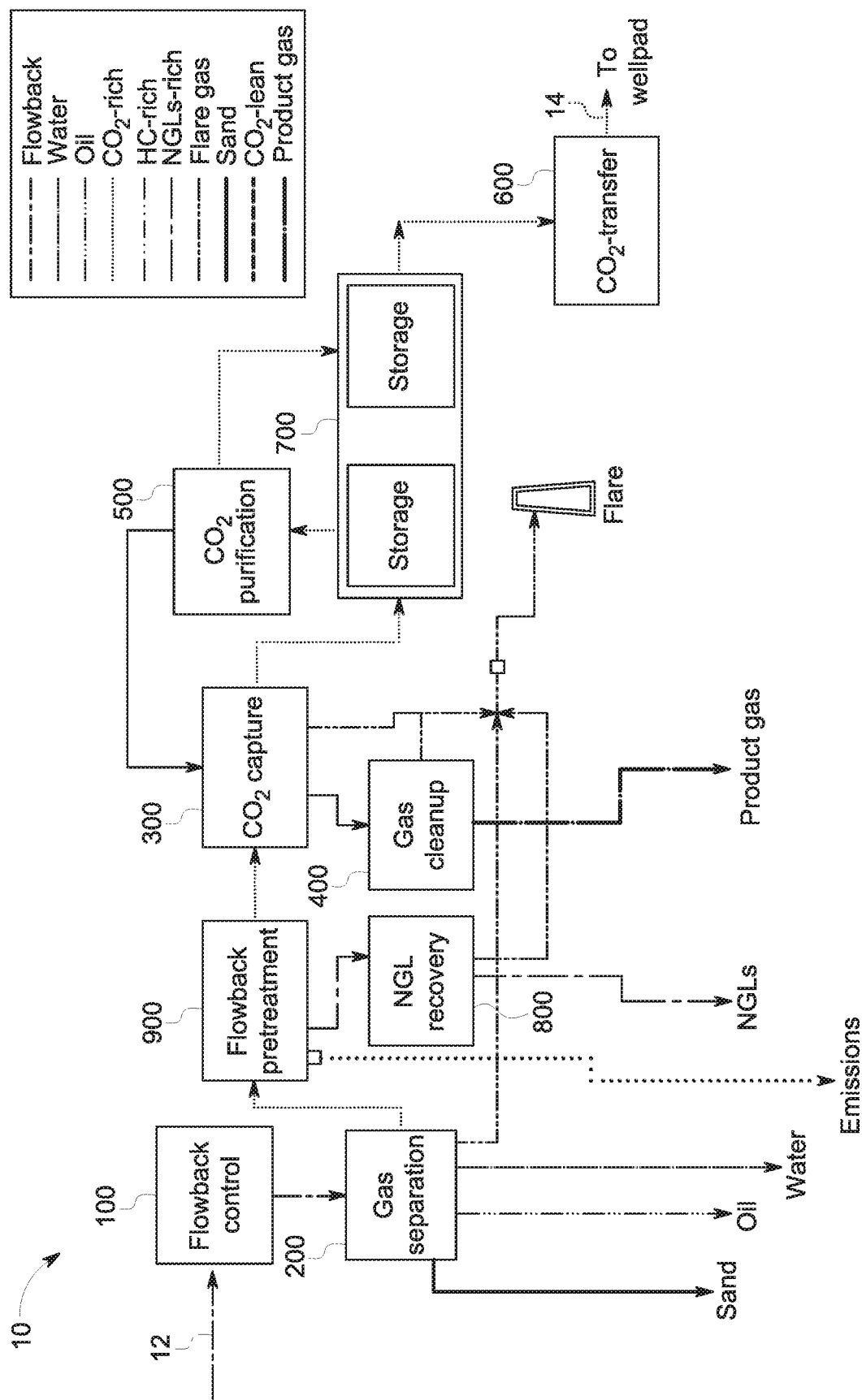
FIG. 1 is a schematic diagram of an apparatus for flowback management and $CO_2$-recovery of a post $CO_2$-stimulation flowback stream, in accordance with one or more embodiments shown or described herein.

Referring to the drawings wherein, as previously stated, identical reference numerals denote the same elements throughout the various views, FIG. 1 depicts in a simplified block diagram, elements of an apparatus for flow management and $CO_2$-recovery 10 including $CO_2$-recapture, according to an embodiment. More particularly, the apparatus 10 provides flowback management and a means for recovering $CO_2$ from a flowback after well-stimulation with $CO_2$-rich fluids. The apparatus 10 includes a flow control zone 100 in fluid communication with a post $CO_2$-stimulation flowback stream 12 (also referred to herein as a flowback stream 12), a gas separation zone 200 in fluid communication with the flow control zone 100, a pretreatment zone 900 in fluid communication with the gas separation zone 200, a $CO_2$-capture zone 300 in fluid communication with the pretreatment zone 900, a gas cleanup zone 400 in fluid communication with the capture zone 300, an optional $CO_2$-storage zone 700 in fluid communication with the $CO_2$-capture zone 300, a $CO_2$-purification zone 500 in fluid communication with at least one of the $CO_2$-capture zone 300 and the $CO_2$-storage zone 700, and a $CO_2$-transfer zone 600 in fluid communication with at least one of the $CO_2$-storage zone 700 and the $CO_2$-purification zone 500 to provide transfer of a $CO_2$-product stream 14 for product end use. An optional natural gas liquid (NGL) recovery zone 800 may further be included in fluid communication with the pretreatment zone 900.

The flowback stream 12 from stimulations based on $CO_2$-rich fluids is highly dependent on the reservoir, the amount of $CO_2$ used for stimulation, the operating conditions during the $CO_2$-stimulation and the flowback conditions. In effect, the rate and composition of the flowback stream 12 will vary between wells with time. The flowback management strategy disclosed herein provides for optimization of the $CO_2$-recovery on a continual basis during the flowback period or the production period. More particularly, the flowback management and $CO_2$-recovery apparatus 10 disclosed herein provides a means to respond to changes in the flowrate in order to control the $CO_2$-recovery process operating conditions to yield $CO_2$-purity within a desired range.

As previously stated, the flowback stream 12 from stimulations based on $CO_2$-rich fluids is characterized by very high initial gas flowrate that contains very high concentrations of $CO_2$ and a rapid decline in $CO_2$ flowrates within a few days of flowback. The disclosed apparatus and method address this change in flowrate and render the $CO_2$-product stream 14 for reuse in the oil and gas industry, e.g. for reuse in subsequent fracturing operations and $CO_2$-based enhanced oil recovery (EOR).

As previously alluded to, current industrial practice provides when the percentage of $CO_2$ is high (e.g. >80% $CO_2$), the gas is vented or flared with hydrocarbon fuel added to ensure combustion and when the percentage of $CO_2$ is between 50% and 80% the gas may be flared directly and when $CO_2$-concentration is <50% but still higher than the pipeline-quality (e.g. ~2-5%), the gas is either flared or sent for gas-cleanup (e.g. gas-permeation membrane selective to $CO_2$-permeation) to make pipeline-quality natural gas. In either case, the $CO_2$ in the flowback stream 12 is not recovered for reuse. The disclosure contained herein addresses $CO_2$-capture from a post-stimulation flowback, and more particularly, the changes in flowrate and composition of the flowback stream in terms of: (i) flowback management and control systems to manage transients; (ii) $CO_2$-capture, by providing optimal recovery of $CO_2$ from the flowback stream based on capital expenditures (CAPEX), operating expenditures (OPEX), a footprint occupied at the wellpad, utilities (power, refrigeration), ease of commission/use/de-commission, operability at well-site, emissions regulations, and value of the recovered $CO_2$ from the flowback stream; (iii) $CO_2$-purification to render a $CO_2$-product that meets reuse needs as well as intermediate transport and storage needs; and (iv) changing process configurations amenable to changing field conditions, e.g. flowback crew operations vs. production crew operations.

Figure 2A:
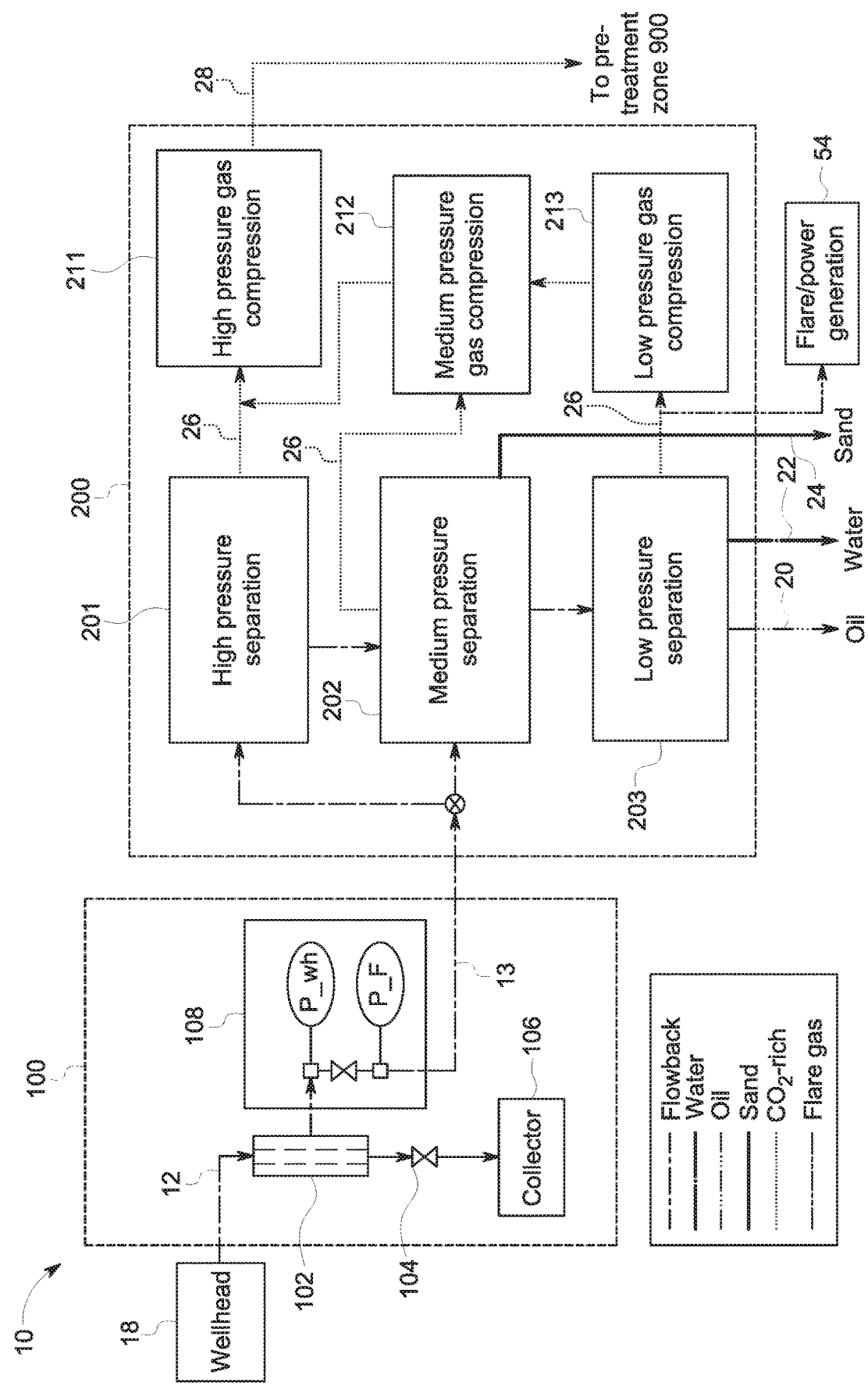
FIG. 2A is further detailed schematic diagram of a portion of the apparatus of FIG. 1, in accordance with one or more embodiments shown or described herein.
Figure 2B:
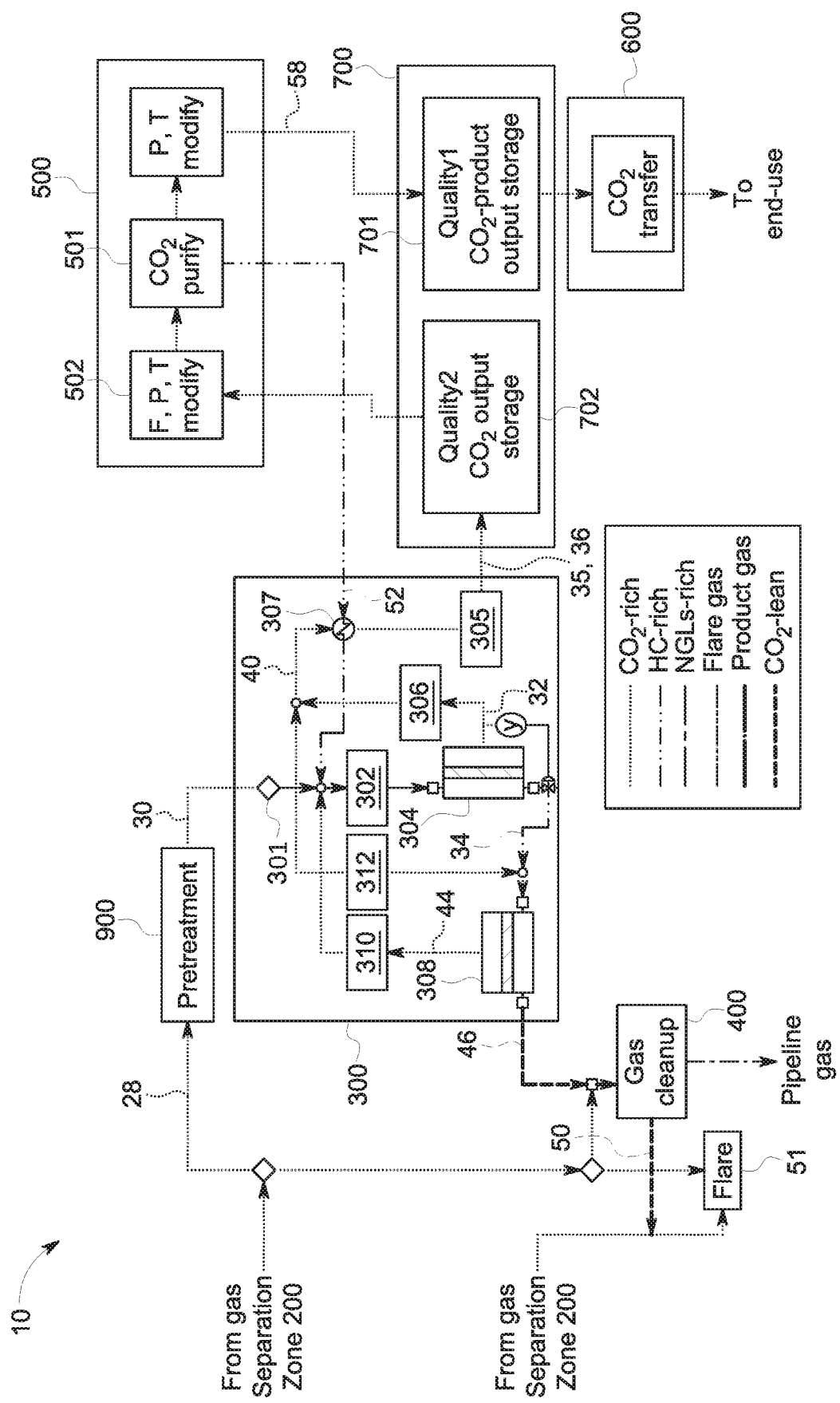
FIG. 2B is a further detailed schematic diagram of a portion of the apparatus of FIG. 1, in accordance with one or more embodiments shown or described herein.

Referring more specifically to FIGS. 2A and 2B, illustrated is a further detailed schematic diagram of the apparatus of FIG. 1. More particularly, further illustrated are each individual zone as it relates to the overall apparatus 10. Referring to FIG. 2A, a flowback stream 12 from a wellhead 18 is initially input to the flow control zone 100. In the flow control zone 100, the flowrate F of the flowback stream 12 is controlled as it is output toward the downstream zones to undergo the $CO_2$-capture process. In an embodiment, during flowback crew operations, "trash", such as the large particles obtained during the millout of the plugs isolating the fracturing stages, is removed from the flowback stream 12, via a separator 102 and collected in a collector 106. During production crew operation there is no trash collector as there is no trash or for that matter no, or minimal, sand anticipated in the flowback stream 12. A choke valve 108 provides for control of the flowback stream 12. More specifically, in an embodiment the choke valve 108 may provide a decrease in the wellhead pressure (P_wh) to a desired flowback pressure (P_F). The flowback stream 12 is output from the flow control zone 100 as a modified flowback stream 13 and enters the gas separation zone 200.

In the gas separation zone 200, the gas portion of the modified flowback stream 13 is further controlled prior to reaching the pretreatment zone 900 and $CO_2$-capture zone 300. More particularly, the gas portion of the modified flowback stream 13 is separated from oil 20 and water 22 contained in the modified flowback stream 13 and if present, sand 24 at a maximum possible pressure (P_H) (e.g. 700 to <1050 psi) in a high pressure gas separator 201 depending on the wellhead pressure and choking constraints. Additional separation of the modified flowback stream 13 components may take place in a medium pressure (P_M) gas separator 202 and in a low pressure (P_L) gas separator 203.

It is noted that the pressure (P) of the modified flowback stream 13 is less than the critical pressure of $CO_2$ (P<Pc of $CO_2$ (1050 psi)). In an embodiment, the medium pressure gas separator 202 operates at a P_M in range of 300 to 700 psi. In an embodiment, the low pressure gas separator 203 serves to further degas the oil 20 and water 22 to recover residual gases and operates at a P_L~atmospheric pressure (e.g. <100 psi). Next, an output gas stream 26 from each of the gas separators 201, 202 and 203 is compressed to a desired pressure (P_CC) in a high pressure gas compressor 211, a medium pressure gas compressor 212 and a low pressure gas compressor 213, respectively. It is noted that in an embodiment, no compressor(s) may be required if the pressure of the output gas stream 26 is high enough to enter the pretreatment zone 900 and eventually the $CO_2$-capture zone 300. A set value for the P_CC could range between 300 to 900 psi depending on design condition in the downstream $CO_2$-capture zone 300. More specifically, as illustrated, an output gas stream 26 from the high pressure gas separator 201 is compressed in the high pressure gas compressor 211. An output gas stream 26 from the medium pressure gas separator 202 is compressed in the medium pressure gas compressor 212 and subsequently in the high pressure compressor 211. An output gas stream 26 from the low pressure gas separator 202 is compressed in the low pressure gas compressor 212 and subsequently in the medium pressure gas compressor 212 and the high pressure compressor 211. Optionally, the output gas stream 26 from the low pressure gas separator 203, or a portion thereof, may not be compressed in the low pressure compressor 213 and subsequently directed to the $CO_2$-capture zone 300 for $CO_2$-recovery, but instead sent either to flare or for power generation, generally referenced 54. In an embodiment the oil 20 and water 22 streams may be isolated in the medium pressure gas separator 202 and the final degassing of the oil 20 and water 22 streams may happen in separate vessels or same vessel in the low pressure gas separator 203. In an embodiment, the output gas streams 26 fed to the compressors 211, 212 and 213 undergoes pretreatment that includes filtration for trace solids and aerogels and coalescers to avoid carryover of produced water 22 and oil 20 to the compressors 211, 212 and 213. A flowback process stream 28 is output from the gas separation zone 200 and enters the pretreatment zone 900, as best illustrated in FIG. 2B.

Referring now to FIG. 2B, the pretreatment zone 900 provides for the removal of trace solids, aerogels, oil, $H_2S$ and water from the flowback process stream 28 to meet $CO_2$-product specifications. To provide such, the pretreatment zone 900 may include a dehydrator 901 that is configured to respond to target $CO_2$-product specifications. For example, liquid $CO_2$ at 350 psi and −10° F. would require dehydration to <2 ppmv water in the flowback process stream 28 in the dehydrator 901. However, dense $CO_2$ at 2,000 psi and 70° F. would require less dehydration to 100 ppmv water in the flowback process stream 28 in the dehydrator 901. It should be understood that throughout this disclosure the target $CO_2$-product specifications may be in terms of % $CO_2$ or in terms of undesired components in the $CO_2$-product, for example, volatiles (C1, $N_2$), or benzene, toluene, ethylbenzene and xylenes (BTEX) or $H_2S$.

Dehydration in the pretreatment zone 900 may be accomplished via use of one or more of: (a) molecular sieve beds; (b) $H_2O$-selective gas permeation membranes with polishing removal using molecular sieve beds, if necessary; and/or (c) dessicant beds, such as calcium chloride ($CaCl_2$), lithium chloride (LiCl), etc. followed by molecular sieve beds for deep dehydration, if necessary. Schemes (b) and (c) may result in smaller molecular sieve beds, if necessary, for deep dehydration. In addition, hydrogen sulfide ($H_2S$) removal, if necessary, may be accomplished using scavengers such as triazine or solid sorbents or $H_2S$-selective membranes.

In an embodiment the pretreatment zone 900, may further provide, when necessary, for natural gas liquids (NGLs) removal in a NGL removal component (described presently), or as previously alluded to, NGL removal may be completed in an NGL recovery zone 800 (described presently) prior to reaching or integrated into the pretreatment zone 900. A pretreated flowback process stream 30 is next output from the pretreatment zone 900 and enters the $CO_2$-capture zone 300 of apparatus 10.

In an embodiment, the $CO_2$-capture zone 300 provides for $CO_2$-capture from the pretreated flowback process stream 30 via condensation at a medium-to-high pressure, control of the condenser temperature (T_Cond), and $CO_2$-enrichment for high $CO_2$-concentration in the captured $CO_2$. A first compressor 302 located within the $CO_2$-capture zone 300 receives the pretreated flowback process stream 30 from the pretreatment zone 900 and provides for the pretreated flowback process stream 30 to flow to a membrane-based first $CO_2$-enricher 304. The first $CO_2$-enricher 304 is operational to provide for a portion of the pretreated flowback process stream 30 to pass through the first $CO_2$-enricher 304 as a $CO_2$-rich permeate stream 32 and a portion of the pretreated flowback process stream to pass through the first $CO_2$-enricher 304 as a $CO_2$-lean gas retentate stream 34. The $CO_2$-rich permeate stream 32 thereafter flows to a second compressor 306, disposed downstream of the first $CO_2$-enricher 304. The first $CO_2$-enricher 304 and the second compressor 306 are configured to aid in meeting target $CO_2$-product specifications.

The $CO_2$-capture zone 300 further includes at least one additional membrane-based $CO_2$-enricher 308 in downstream flow communication with the $CO_2$-lean gas retentate stream 34 flowing from the first $CO_2$-enricher 304. The at least one additional $CO_2$-enricher 308 is operational to provide a portion of the pretreated flowback process stream 30, and more specifically, the $CO_2$-lean gas retentate stream 34 from the first $CO_2$-enricher 304, to pass through the at least one additional $CO_2$-enricher 308 as a $CO_2$-rich permeate stream 44 and a portion of the pretreated flowback process stream and more specifically, the retentate stream 34 from the first $CO_2$-enricher 304, to pass through the at least one additional $CO_2$-enricher 308 as a $CO_2$-lean gas retentate stream 46. The $CO_2$-rich permeate stream 44 thereafter flows to at least one additional compressor 310 for recompression. The at least one additional $CO_2$-enricher 308 and the at least one additional compressor 310 are configured to aid in meeting target $CO_2$-product specifications.

In an embodiment, the retentate stream 34 from the first $CO_2$-enricher 304 and the $CO_2$-lean gas retentate stream 46 from the at least one additional $CO_2$-enricher 308 may contain liquids due to the Joule-Thompson effect. In such case, the liquid may be separated from the retentate stream to provide a vapor stream that is heated to the desired temperature before feeding to the next membrane stage, such as the at least one additional $CO_2$-enricher 308 or a membrane in the gas cleanup zone 400. It is anticipated that the first $CO_2$-enricher 304 and the at least one additional $CO_2$-enricher 308 may be arranged as membrane modules in series or parallel. When arranged in series, the liquid separation in the retentate streams and reheating of the vapor stream is accomplished prior to sending the retentate stream to the next downstream module.

As previously alluded to, in the illustrated embodiment the pretreated flowback process stream 30 is directed to the first compressor 302 and first $CO_2$-enricher 304 and yields the $CO_2$-rich permeate stream 32 that is sent to the condenser 305, and the $CO_2$-lean gas retentate stream 34 that is submitted to the at least one additional $CO_2$-enricher 308, to yield the $CO_2$-rich permeate stream 44. The $CO_2$-rich permeate stream 44 is next compressed in the at least one additional compressor 310 and ultimately redirected to the first $CO_2$-enricher 304 for further processing. Furthermore, in an embodiment, a portion of the pretreated flowback process stream 30 may be directed to a compressor 312 so as to bypass an initial enriching of that portion of the pretreated flowback process stream 30 (described presently). Further detailed flow diagrams for the pretreated flowback process stream 30 will be described with regard to FIGS. 3-6.

The $CO_2$-rich permeate stream 32, as stated, is sent to the condenser 305 where the bulk of the $CO_2$ is condensed as a liquid. In an embodiment, a residual gas stream (not shown) from the condenser 305 may be returned to the first $CO_2$-enricher 304 for enrichment via the first compressor 302, described presently. The condensed liquid in the condenser 305, as previously identified, may be referred to as the Quality2 $CO_2$-output stream. In an embodiment, the amount of enrichment in the first $CO_2$-enricher 304 and the at least one additional $CO_2$-enricher 308 is dependent on the $CO_2$-concentrations in the flowback stream 12 entering the apparatus 10, the operating conditions in the $CO_2$-enrichers 304, 308, and the desired Quality2 $CO_2$-concentration (y_Q2).

The operating conditions in the condenser 305, and more specifically the temperature (T_Cond) and pressure (P_Cond) in the condenser 305, are chosen to minimize the overall energy consumption, equipment cost and footprint. As a first example, for P_Cond=900 psi, the value of T_Cond would be approximately 55° F. to 60° F. to render a condensed Quality2 $CO_2$ phase with y_$CO_2$=90% $CO_2$. As a second example, for P_Cond=350 psi, the value of T_Cond would be approximately 0° F. to yield the similar Quality2 $CO_2$-concentration. While the process of first example requires more gas compression vs the second example, it requires less refrigeration costs. In an embodiment, a vapor-liquid separator (not shown) may be associated with the condenser 305 to provide a liquid of desired Quality2 $CO_2$ while a residual gas stream (not shown) is directed for further $CO_2$-recovery.

The first $CO_2$-enricher 304, the at least one additional $CO_2$-enricher 308 and the compressors 302, 306, 310, 312 provide a means, when used in combination, to provide a captured $CO_2$-flow stream 35 in the form of an intermediate quality $CO_2$-output stream, referred to herein as a Quality2 $CO_2$-output stream (x_Q2) 36, from the $CO_2$-capture zone 300 that remains in a desired $CO_2$-concentration range even as the $CO_2$-concentration in the flowback stream 12 changes with time. In an embodiment x_Q2 may be defined in terms of $CO_2$-concentration (e.g. 90% $CO_2$) or a volatile component, such as methane (e.g. 5% C1). In an embodiment, the captured $CO_2$-flow stream 35 may be of sufficient purity for reuse purposes, requiring no further processing (described presently), and thus referred to as a Quality1 $CO_2$-output stream. The Quality2 $CO_2$-output stream 36 may be further purified, as described presently in the purification zone 500. In an embodiment, the Quality2 $CO_2$-output stream 36 may be directed to a remote site for further purification. In an embodiment the $CO_2$-concentration in the Quality2 $CO_2$-output stream 36 is in a range of 85% to 99%. In an embodiment the methane concentration in the Quality2 $CO_2$-output stream 36 is in a range of 1% to 10%.

In an embodiment, the first $CO_2$-enricher 304 and the at least one additional $CO_2$-enricher 308 are configured in a cascading relationship and employ a $CO_2$-selective membrane process. In an embodiment, the first $CO_2$-enricher 304 and the at least one additional $CO_2$-enricher 308 are stable to hydrocarbon condensates. In an embodiment, the first $CO_2$-enricher 304 and the at least one additional $CO_2$-enricher 308 may include one or more membranes formed of films or hollow fibers, comprised of CO2-selective materials, such as polyetheretherketone (PEEK), cellulose acetate, polyimides, or the like. The membrane material and operating conditions are chosen so that the $CO_2$-concentration of the $CO_2$-rich permeate streams 32 and 44 are greater than in the flowback stream 12 concentration. In an embodiment the $CO_2$-concentration in the $CO_2$-rich permeate stream 32 and 44 is in a range of 85% to >99%. This provides that a compressed enriched $CO_2$-stream 40 entering the condenser 305 is sufficient to yield the desired value of x_Q2, or alternatively, the desired value of x_Q1 if criteria is met. In an embodiment, the temperature and pressure of the pretreated flowback process stream 30 entering the first $CO_2$-enricher 304 is manipulated via the compressor 302 and in response to any additional flow streams being mixed therewith, including one of an after-cooler or a heat-exchanger. Similarly, the pressure on the permeate-side of the enricher 304 is chosen so that the desired enrichment in the $CO_2$-rich permeate 32, and more specifically the compressed enriched $CO_2$-stream 40, is achieved based on feed concentrations and membrane modular sizes employed. Similarly, the permeate stream 44 exiting the at least one additional $CO_2$-enricher 308 is manipulated via the at least one additional compressor 310 prior to redirecting through the first compressor 302 and the first $CO_2$-enricher 304. The compressor 306 disposed downstream of the first $CO_2$-enricher 304 serves to compress the $CO_2$-rich permeate 32 exiting the $CO_2$-enricher 304 at the P_Cond pressure.

It is noted that due to permeation of the gaseous components across the membrane of the $CO_2$-enricher 304 and the at least one additional $CO_2$-enricher 308 and consequent gas-expansion there may be some cooling of the pretreated flowback process stream 30 due to the Joule-Thompson effect. The extent of cooling depends on the pressure drop and the J-T coefficients of the components involved. This drop in temperature decreases the flux rate through the membrane of the $CO_2$-enricher 304 and the at least one additional $CO_2$-enricher 308. This cooling, especially on the high pressure (feed or retentate) side of the membrane of the $CO_2$-enricher 304 and the at least one additional $CO_2$-enricher 308 may cause condensation of higher-boiling hydrocarbon (NGLs) components.

Of interest is the choice of $CO_2$-concentration in the $CO_2$-lean gas retentate (non-permeate) streams 34 and 46. If the design value of the $CO_2$-lean gas retentate streams 34 and 46 is chosen to be very small, greater $CO_2$-recovery in the permeate streams 32 and 44, and more particularly into the enriched $CO_2$-stream 40, is achieved. However, low design values of $CO_2$ in the $CO_2$-lean gas retentate streams 34 and 46 may also result in lower $CO_2$-concentration in the permeate streams 32 and 44 and thus the compressed enriched $CO_2$-stream 40 entering the condenser 305. Hence, in order to achieve the desired concentration (y_Cond) of $CO_2$ entering the condenser 305, the extent of separation in the membranes of the enrichers 304 and 308 may be controlled by choosing an optimal value for the $CO_2$-concentration in the $CO_2$-lean gas retentate streams 34 and 46. The value of the $CO_2$-concentration in the $CO_2$-lean gas retentate streams 34 and 46 may aid in the design of the membranes in the enrichers 304 and 308, with dependency on the feed concentrations and the permeation/selectivity properties of the membrane employed. For example, the value of the $CO_2$-concentration in the $CO_2$-lean gas retentate stream 34, for design purposes, may be limited to >30% $CO_2$ when the pretreated flowback process stream 30 to the first $CO_2$-enricher 304 is >60% for a membrane that has a selectivity of >10 for $CO_2$ relative to C1. This control of the $CO_2$-lean gas retentate stream 34 provides a resultant $CO_2$ concentration in the $CO_2$-enriched stream 32 of <85%. Utilizing a membrane with a higher selectivity for $CO_2$ relative to hydrocarbons would allow for greater $CO_2$ recovery in the first $CO_2$-enricher 304 while still yielding sufficient concentration in the $CO_2$-rich permeate stream 32 to meet the $CO_2$ product specification. A desired CO product specification is achieved by controlling the $CO_2$ concentration in $CO_2$-rich permeate stream 32 via the extent of $CO_2$ recovery in the first $CO_2$-enricher 304. This may be accomplished by controlling the membrane area in the first $CO_2$-enricher 304 (e.g. number of modules employed at any time for the operating pressure and temperature conditions).

The $CO_2$-lean gas retentate stream 34 is output as a $CO_2$-lean gas from the first $CO_2$-enricher 304 of the $CO_2$-capture zone 300 to the at least one additional $CO_2$-enricher 308. Similarly, the CO2-concentration in the $CO_2$-lean gas retentate stream 46, for design purposes, may be limited to >10% $CO_2$ when the retentate stream 34 to the at least one additional $CO_2$-enricher 308 is >50% for a membrane that has a selectivity of >10 for $CO_2$ relative to C1. However, this value may be different if the retentate stream 34 to the at least one additional $CO_2$-enricher 308 contains only 30% $CO_2$. The $CO_2$-lean gas retentate stream 46 is output as a $CO_2$-lean gas from the at least one additional $CO_2$-enricher 308 of the $CO_2$-capture zone 300 to the gas cleanup zone 400.

The $CO_2$-lean gas retentate stream 46 is treated in the gas cleanup zone 400 to render a pipeline-quality natural gas stream 48 (e.g. 2% to 5% $CO_2$ and <7 lbs/MMSCF $H_2O$). A $CO_2$-selective gas-separation membrane may be used in the gas cleanup zone 400 to provide such pipeline-quality natural gas stream 48. In addition, treatment of the $CO_2$-lean gas retentate stream 46 may render a $CO_2$-rich permeate stream 50 having a low amount of $CO_2$ and hence may be flared as a flare gas via a flare 51, used as a fuel for on-site power generation, or returned to the low pressure gas compressor 213 for further processing.

In an embodiment, where the output is the Quality2 $CO_2$-output stream 36, the storage of the Quality2 $CO_2$-output stream 36 from the $CO_2$-capture zone 300 is stored within the $CO_2$-storage zone 700, and more particularly, within one or more Quality2 $CO_2$-storage tanks 702. The storage of the intermediate Quality2 $CO_2$-output stream 36 within the storage zone 700 provides control of a flowrate of the Quality2 $CO_2$-output stream 36 to the downstream purification zone 500. This control of the flowrate ensures smooth operating conditions in a distillation column (described presently) in the purification zone 500. In an embodiment, the storage pressure and temperature conditions may be different from the pressure and temperature conditions in the condenser 305 of the $CO_2$-capture zone 300 or in the purification zone 500. In an embodiment, the storage conditions in the storage zone 700 may be chosen for optimal storage tank costs and footprint, and energy usage. However, under certain conditions when the process operations in the 305 condenser result in a Quality1 $CO_2$-output stream, referred to herein as Quality1 $CO_2$-product stream 58, suitable for reuse, storage of the product in storage tanks 702 and further processing is not required.

Located downstream of the storage zone 700 is the purification zone 500, where the Quality2 $CO_2$-output stream 36 produced in the $CO_2$-capture zone 300 is purified to render a $CO_2$-product stream fit for reuse. In an embodiment, the purification zone 500 utilizes distillation in a purifier 501 to purify the Quality2 $CO_2$-output stream 36 wherein a bottom stream is the Quality1 $CO_2$-product stream 58 while a $CO_2$-lean distillate may be returned in a $CO_2$-lean distillate stream 52 to the $CO_2$-enrichers 304 for $CO_2$-recovery. The choice of the distillation pressure and temperature conditions is important and is based on the $CO_2$-product end-use as well as storage and transfer requirements. For example, for conventional liquid $CO_2$-transport trucks operating at approximately 350 psig and −10° F., it is necessary to reduce the volatile components, mainly C1 and N2 to low values (e.g. <1% to 3 vol %). However, for transport in high-pressure tanks, such as 2,000 psi, higher amounts of these components may be allowed. In addition, in an embodiment the choice of the pressure and temperature may be optimized for reduced footprint and energy used for refrigeration of the condenser in the distillation column as well as for product-cooling.

A flowrate, temperature and pressure of the Quality2 CO2-output stream 36 entering the purifier 501 may be manipulated via a component 502, including one of a liquid pump if a higher pressure is desired or a depressuring valve if a lower pressure is desired, and optionally a heat exchanger to control temperature. Accordingly, the feed conditions to the purifier 501 for the purification process are controlled by controlling the feed concentration y_$CO_2$ in the $CO_2$-capture zone 300, as previously described, and the flowrate via the component 502.

The Quality1 $CO_2$-product stream 58 output from the purification zone 500 may be stored within a $CO_2$-storage zone 700, and more particularly, within one or more Quality1 $CO_2$-storage tanks 701 in the $CO_2$-storage zone 700. The storage of the Quality1 $CO_2$-product stream 58 within the storage zone 700 may provide control of a flowrate of the Quality1 $CO_2$-product stream 58 to the downstream $CO_2$-transfer zone 600. In an embodiment, the storage pressure and temperature conditions may be different from the pressure and temperature conditions in the condenser 305 of the $CO_2$-capture zone 300 or in the purification zone 500, where present. As previously indicated, in an embodiment, the storage conditions in the storage zone 700 may be chosen for optimal storage tank costs and footprint, and energy usage.

To accommodate the variable flowback rate profile, apparatus 10, and more particularly the process equipment, such as the compressors, heat-exchangers, separation vessels, membrane modules, liquid pumps in the different zones as discussed above are each chosen as a system of parallel units that are appropriately sized so that the entire flowrate regime can be handled without incurring over-design or under-design issues for desired separation or heat-transfer performance. For example, the flowrate of the flowback stream 12 from the wellhead 18 may range from 2 MMSCFD to 15 MMSCFD over a flowback period. Hence, the gas compressors in the gas separation zone 200 may be organized as individual compressors configured in a parallel arrangement, with each compressor having a capacity range of 2 to 5 MMSCFD, allowing the capability to handle flows from 2 to 15 MMSCFD by employing only one or all three of the compressors. Moreover, the lower range of the capacity may be further reduced to <1 MMSCFD by recirculating some of the gas streams exiting each of the compressors at an outlet of each, back to a respective compressor-inlet after cooling.

Figure 3:
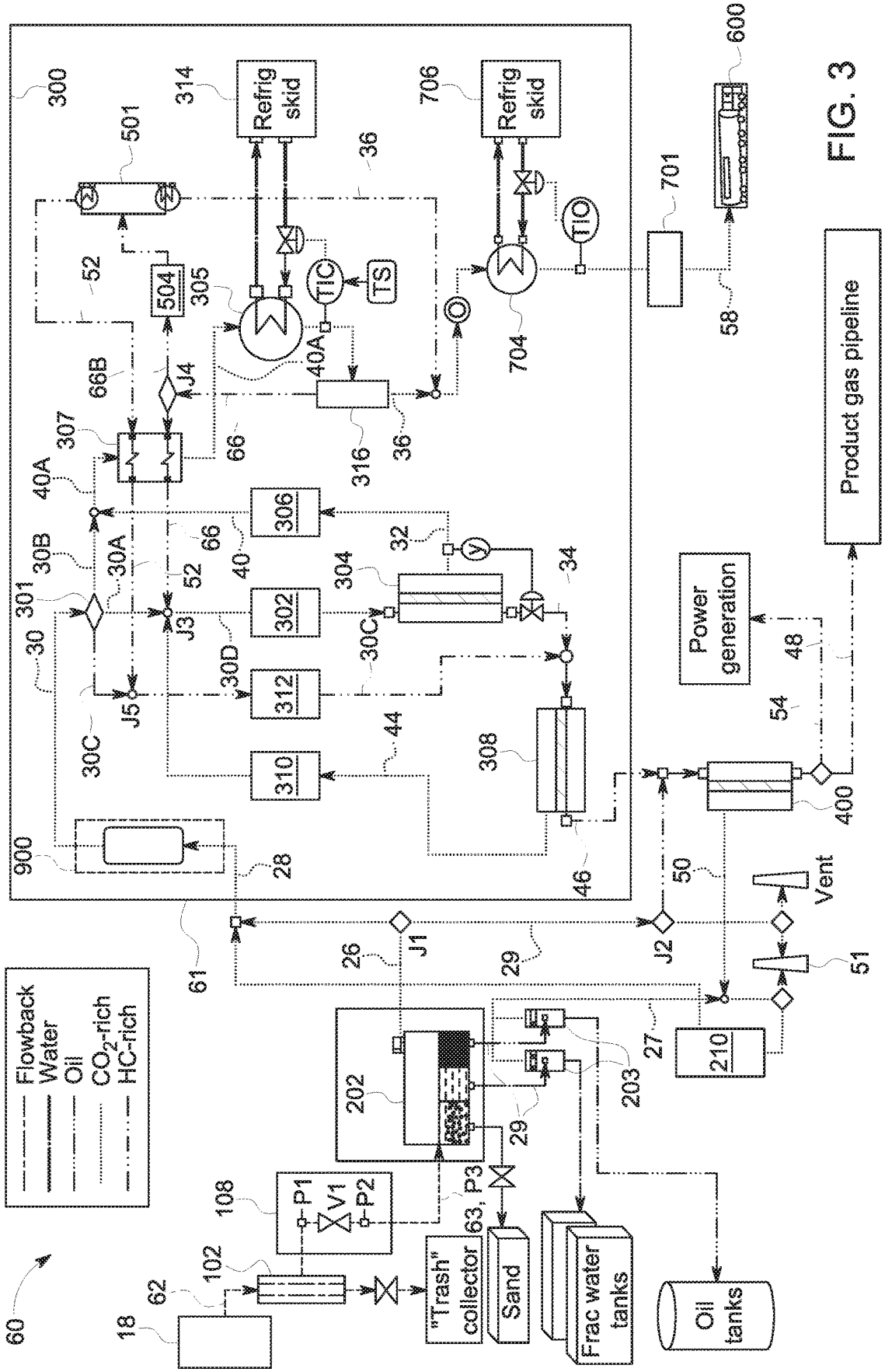
FIG. 3 is a detailed schematic diagram of an apparatus for flowback management and $CO_2$-recovery of a high pressure post $CO_2$-stimulation flowback stream, in accordance with one or more embodiments shown or described herein.
Figure 4:
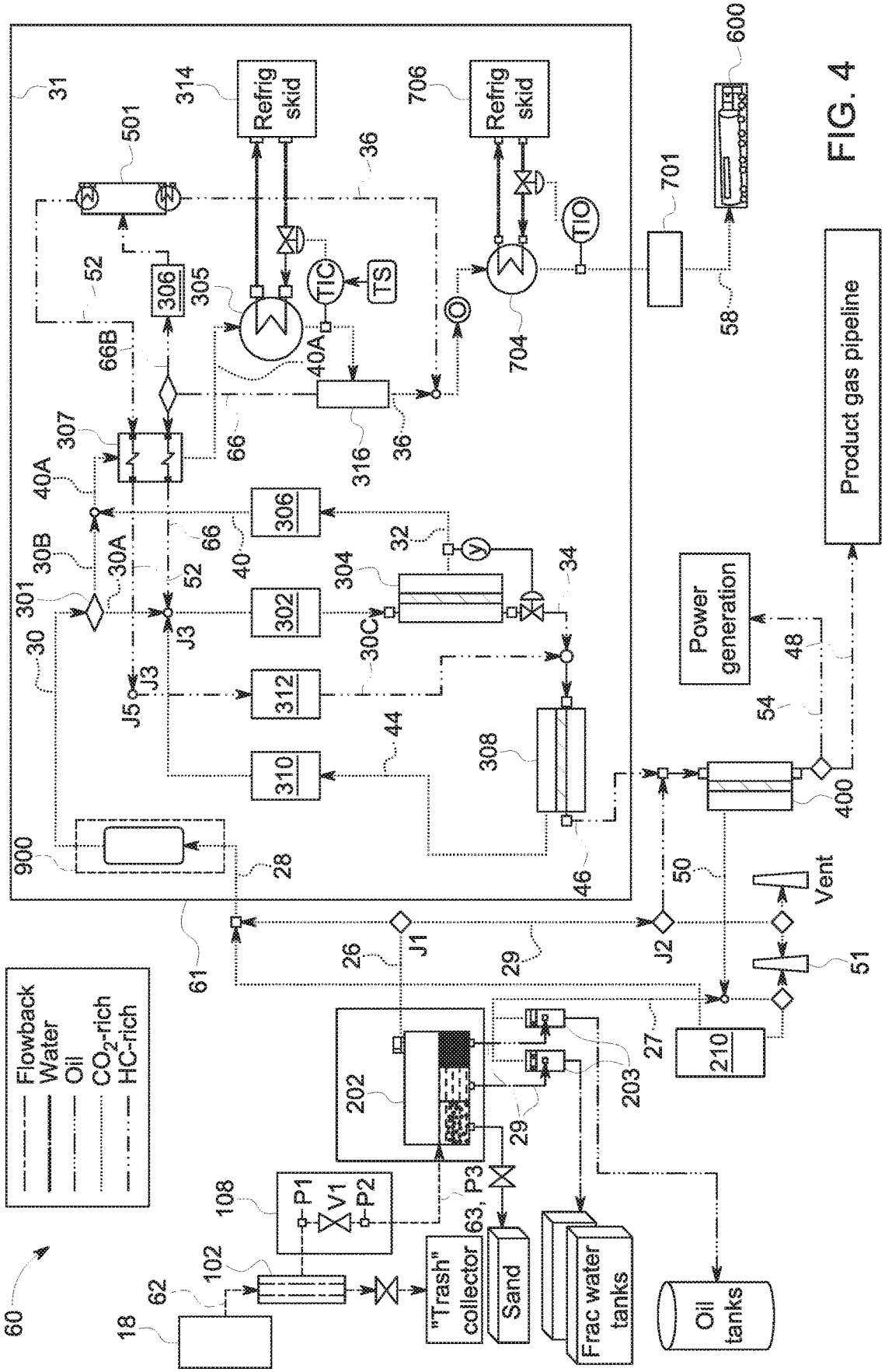
FIG. 4 is a detailed schematic diagram of an alternate embodiment of an apparatus for flowback management and $CO_2$-recovery of a high pressure post $CO_2$-stimulation flowback stream, in accordance with one or more embodiments shown or described herein.
Figure 5:
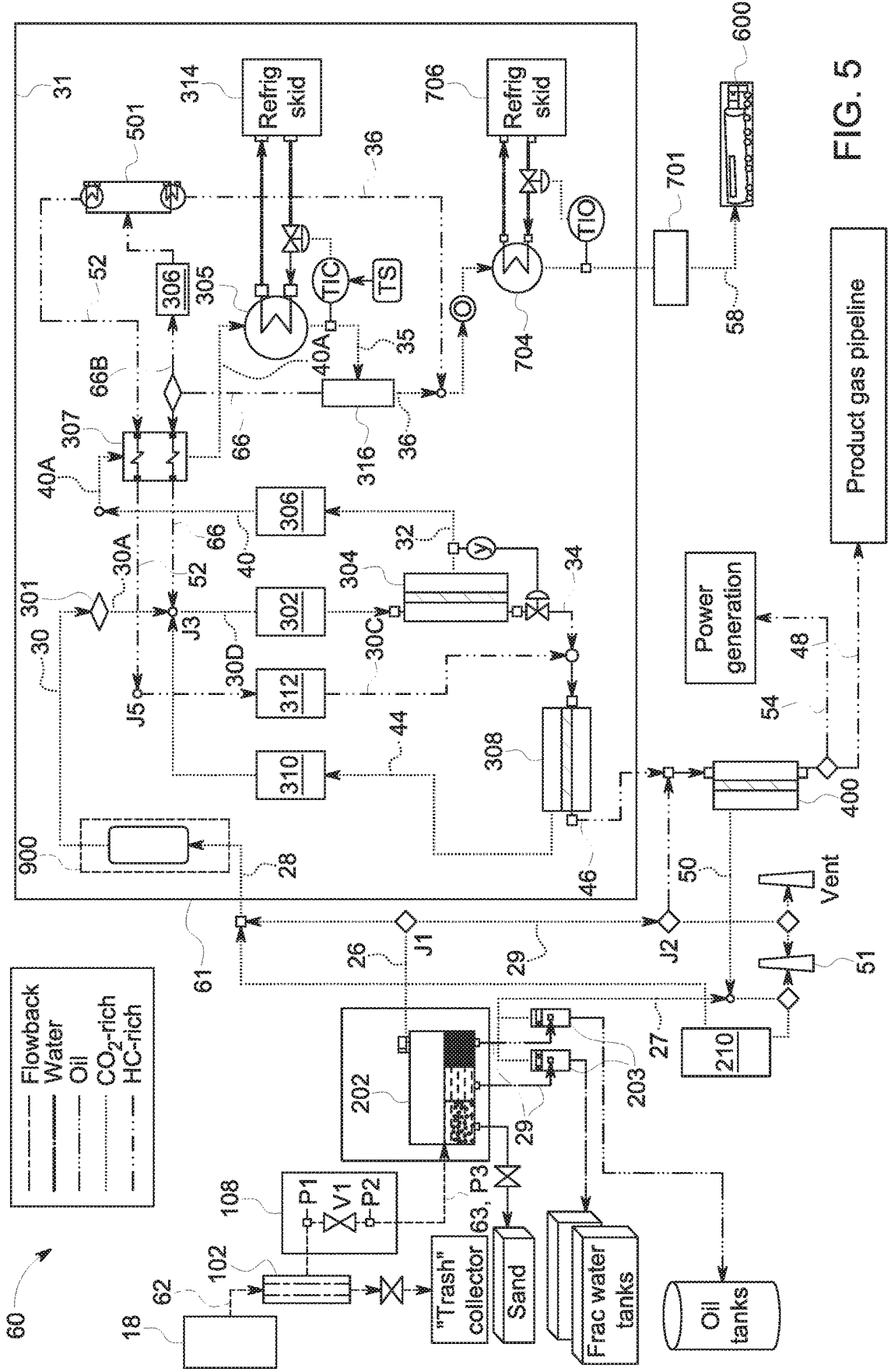
FIG. 5 is a detailed schematic diagram of an alternate embodiment of an apparatus for flowback management and $CO_2$-recovery of a high pressure post $CO_2$-stimulation flowback stream, in accordance with one or more embodiments shown or described herein.
Figure 6:
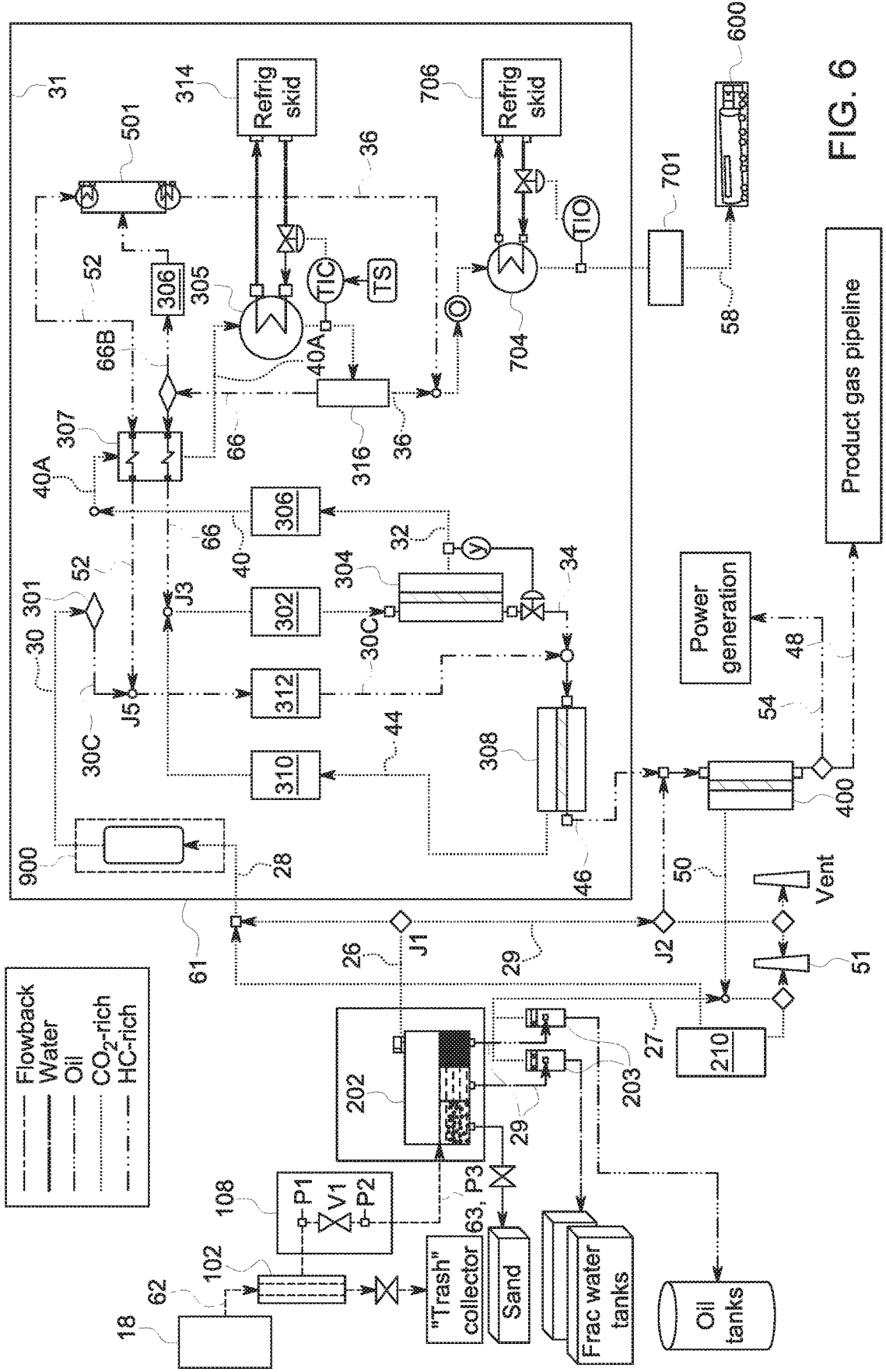
FIG. 6 is a detailed schematic diagram of an alternate embodiment of an apparatus for flowback management and $CO_2$-recovery of a high pressure post $CO_2$-stimulation flowback stream, in accordance with one or more embodiments shown or described herein.

Referring now to FIG. 3, illustrated is a further detailed schematic diagram illustrating an implementation of the apparatus of FIGS. 2A-2B for flowback management and $CO_2$-recovery of a post $CO_2$-stimulation flowback stream. More particularly, illustrated is an apparatus 60, generally similar to apparatus 10 of FIGS. 2A-2B, in which the portion of the figure that specifically pertains to the $CO_2$-recovery process is indicated by shaded portion 61. Accordingly, similar features to those of apparatus 10 will be similarly labeled in FIG. 3. In this particular embodiment, the apparatus 60 is configured for use with a post $CO_2$-stimulation flowback stream 62, (also referred to herein as a flowback stream 62) such as a flowback stream having a pressure of 300~2000 psi. FIGS. 4-6, described presently, illustrate alternative operational embodiments of the apparatus of FIG. 3, with indicated alternative flow paths dependent upon the concentration of $CO_2$ in the flowback stream 12.

Referring more specifically to FIG. 3, a method of recovering $CO_2$ from a flowback after well-stimulation with $CO_2$-rich fluids, in keeping with the embodiment of FIG. 1 is described. The flowback stream 62 containing trash/oil/water/gas is first directed to a conventional trash removal screen in the flow control zone 100 that effectively removes large particles. The rate of the flowback stream 62 is then modified by a valve V1, such as a choke valve, to render a modified flowback stream 63. In an embodiment, the valve V1 is configured as a choke valve assembly 108 and may include a plurality of valves arranged in a parallel circuit. Operation of valve V1 is a critical safety item during the flowback crew operations whereby manipulation of the valve V1 ensures that the casing-pressure near the workover rig is below a set-point, typically 2,000 psig. In many instances, one or more of the valves that comprise the valve V1 become frequently plugged by sand, thus making it necessary to switch to a parallel valve. In many instances, this may lead to fluctuations in the line pressure downstream from the valve V1. In addition, the valve V1 may be manipulated to obtain a desired flow of the flowback stream 62 to ensure cleanout of the sand from the wellhead 18. The modified flowback stream 63 from valve V1 is input to the $CO_2$-capture process, and more particularly to the downstream processing zones.

A first step in the $CO_2$-capture process involves separation of the modified flowback stream 63, and more particularly, separation of the gas from the oil/water/sand. It is desired to obtain the gas at as high a pressure as possible for two reasons: (a) ability to condense the $CO_2$ at higher temperatures (e.g. 50° F. at 900 psig vs. 0° F. at 350 psig); and (b) ability to utilize smaller equipment sizes for separation vessels, membrane separation units, distillation, etc. In an embodiment, the high pressure post $CO_2$-stimulation flowback stream 62 is evolved at 300~350 psi, modified to render the modified flowback stream 63 and may optionally be compressed in one or more compressors, such as compressors 211, 212 and 213 of FIG. 2 in the gas separation zone 200 to approximately 900 psig to allow bulk condensation of $CO_2$ at ambient temperatures (e.g. >40° F.). The compressing of the modified flowback stream 63 and bulk condensation at these temperatures allows for use of refrigeration at higher evaporating fluid temperatures of the refrigerant used in the external refrigeration skid compared to bulk condensation of $CO_2$ at lower temperatures (e.g. 0° F. at 350 psig). Bulk condensation at these temperatures will allow a limited refrigeration system to be employed, as necessary, for product cooling. The advantage of conducting the condensation at a high pressure, such as 900 psig is that condensation may be achieved at >40° F. so that the practical liquid-leaving-temperature of the refrigeration system is >20° F. By contrast, performing the same condensation at 350 psig would require the condensing temperature of approximately 0° F. which would entail liquid-leaving-temperature of the refrigeration system to be around −20° F. Known refrigeration capacities of commercially-available trailer-mounted units decrease sharply as the liquid-leaving-temperature decreases. Thus, higher condensation temperatures entail lower capital equipment costs, lower footprint and lower energy costs. The offset is that the overall system cost, including the cost of gas compression to pressure PA, needs to be considered. Keeping pressures <Pc for $CO_2$ allows transition between gas to liquid $CO_2$ phases avoiding supercritical $CO_2$ transitions whose physical properties are difficult to predict for process control. In the embodiment of FIG. 3, the post $CO_2$-stimulation flowback stream 62 does not undergo compression in a compressor, such as compressors 211, 212 and 213 of FIG. 2A in the gas separation zone 200. The only compression in apparatus 60 takes place within the $CO_2$-capture zone 300.

In the exemplary embodiment of FIG. 3, the modified flowback stream 63, is directed to a medium pressure gas separator 202 where the gas is flashed off the oil/water/sand mixture. In an embodiment, the medium pressure gas separator 202 is a conventional horizontal separator. In an embodiment, the modified flowback stream 63 has a pressure (P3) of approximately 350 psig and a temperature (T1) of the ambient environment. The medium pressure gas separator 202 provides separation of sand 12 from the oil/water/gas streams and directing of the oil/water/gas streams to one or more low pressure gas separators 203, which in an embodiment is a column separator operating at a pressure (P2) of 250-500 psig, and preferably approximately 350 psig and having a temperature (T2) of $T2 > T_{critical}\ CO_2$.

An output gas stream 27 from the one or more low pressure separators 203 may be sent to flare 51 or recompressed in an optional flare gas recompressor 210 and combined with an output gas stream 26 from the medium pressure gas separator 202 to yield the flowback process stream 28 at a pressure PF. In an embodiment, a portion 29 of the output gas stream 26 may be directed via junctions J1 and J2 to the flare 54 and/or vented, or directed to the gas cleanup zone 400 for further processing.

Figure 7:
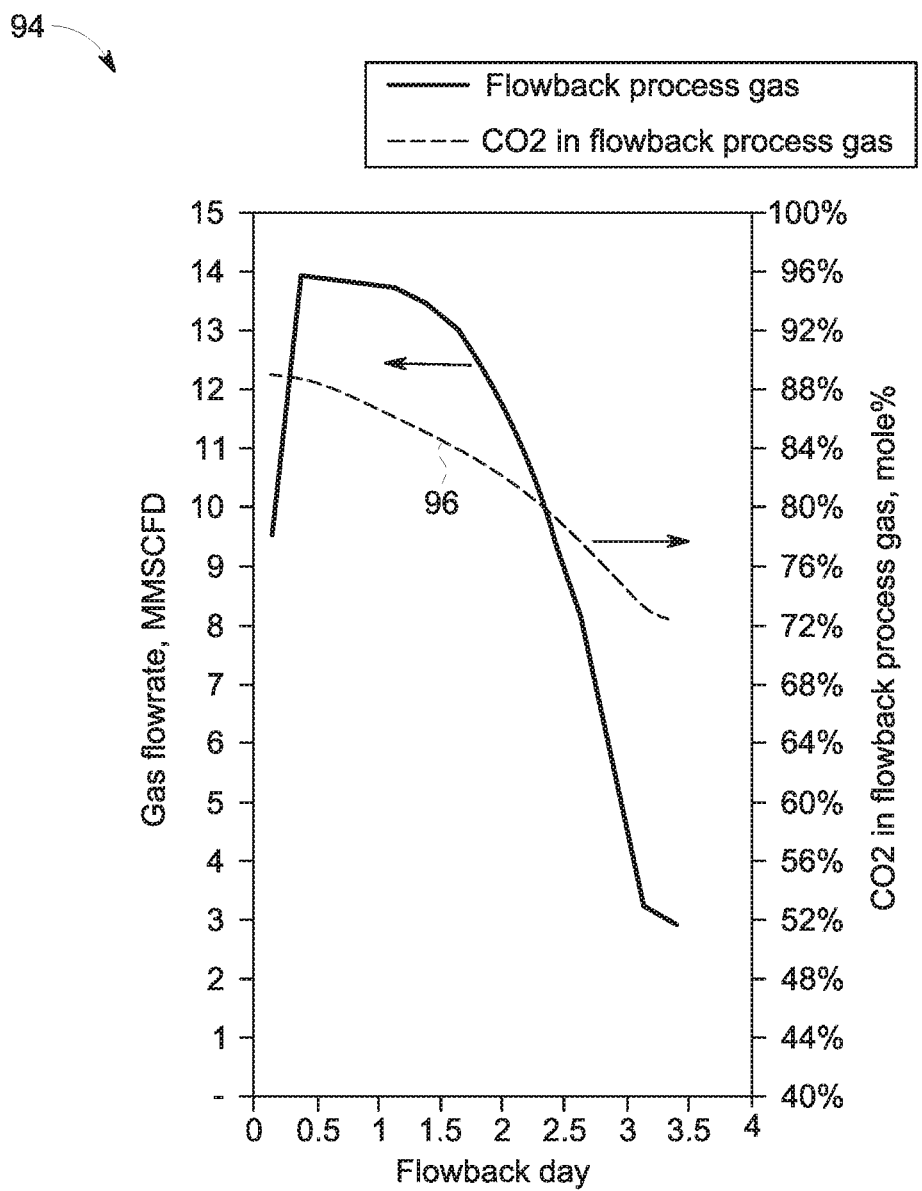
FIG. 7 is a graphical representation illustrating the gas flowrates as a function of time, in accordance with one or more embodiments shown or described herein.

The rate and composition of the $CO_2$ in the flowback process stream 28 will vary as a function of time. An example, by way of a graphical illustration 94, is shown in FIG. 7 in which a flowrate of the flowback process stream 28 (as indicated by a dashed line 96) varies from a maximum of approximately 14 MMSCFD to as low as 3 MMSCFD over a 3.5 day period. It was noted that the $CO_2$-concentration in the flowback process stream 28 changed from approximately 90% to approximately 70%. It is noted that there is a dynamic component to the rate profile that is greatly affected by the flowback crew operations associated with the $CO_2$-capture steps, such as millout, cleanout, production tubing install or simply stoppages/restarts or due to the well output itself. Also, it is noted that the flowback gas compositions and flowrates may vary significantly from well-to-well depending on the well characteristics and the flowback crew operation philosophy.

Referring again to FIG. 3, the flowback process stream 28 is output to the pretreatment zone 900 to remove contaminants when present, such as liquid droplets, solid particles, $H_2S$, and $H_2O$. The extent of $H_2O$ removal is determined by allowable $H_2O$ in the $CO_2$-product. For a $CO_2$-product at 350 psig/−10 F, the $H_2O$ specification may be as low as 2 ppmv, but if the $CO_2$-product that is stored and used at >1,200 psig, higher $H_2O$-content may be tolerated. The flowback process stream 28 is output subsequent to pretreatment, to the $CO_2$-capture zone 300 as the pretreated flowback process stream 30. As previously indicated, optional NGL removal may be employed to remove NGL from the flowback process stream 28. Additional information regarding the inclusion of an NGL removal means may be found in U.S. patent application Ser. No. 14/974,825, titled "Flowback Management and $CO_2$-Recovery System and Method of Use," which is filed simultaneously herewith and incorporated herein in its entirety.

The first $CO_2$-enricher 304, the at least one additional $CO_2$-enricher 308 and the compressors 302, 306, 310 and 312, disposed in the described cascading configuration, are configured to yield the desired $CO_2$ product quality. As best illustrated in FIG. 3, a flow splitter 301 within the $CO_2$-capture zone 300 receives the pretreated flowback process stream 30 from the pretreatment zone 900 and provides for splitting of the pretreated flowback process stream 30 dependent upon the percent concentration of $CO_2$ therein, as described presently. As illustrated in FIG. 3, the flow splitter 301 is configured as a three-way splitter, thereby allowing for the directing of a portion 30A of the pretreated flowback process stream 30 to the first compressor 302 and first $CO_2$-enricher 304, the directing of a portion 30B to the condenser 305 and a portion 30C to the compressor 312, thereby bypassing the first CO2-enricher 304 prior to reaching the at least one additional $CO_2$-enricher 308. The quantity of the pretreated flowback process stream 30 that is redirected to each component is dependent upon the percentage of $CO_2$ present in the pretreated flowback process stream 30 at any given time. The flow splitter 301 is operational to vary the portions 30A, 30B and 30C of the pretreated flowback process stream 30 to meet target $CO_2$-product specifications at one or more locations in the apparatus (described presently). The flow splitter 301 is operational to vary the quantity of each portion 30A, 30B and 30C of the pretreated flowback process stream 30 passing therethrough to a respective flow path between 0%-100%.

In an embodiment, the first $CO_2$-enricher 304 is configured to provide flow through of the $CO_2$-rich permeate stream 32 based on this end product criterion. The criterion may be decided based on a desired $CO_2$-concentration or an undesired component, for example a volatile component such as methane. In an embodiment, the pretreated flowback process stream 30, and more particularly a mixed stream 30D (described presently) is manipulated in the first $CO_2$-enricher 304 to provide a flow through of a $CO_2$-rich permeate stream 32 having a specified target composition of $CO_2$ or C1. The flow through $CO_2$-rich permeate stream 32 exits the compressor 306 as the compressed enriched $CO_2$-stream 40

The compressed $CO_2$-rich permeate stream 40, is mixed with the portion 30B of the pretreated flowback process stream 30 (if any), to form a mixed compressed $CO_2$-rich stream 40A and cooled via the condenser 305 via an external refrigeration system 314 using a glycol/water mixture or other heat-transfer fluid.

Portion 30C of the pretreated flowback process stream 30, as previously described, is directed to the compressor 312 and bypasses the first $CO_2$-enricher 304. This directing is determined based on the percentage concentration of $CO_2$ in the pretreated flowback process stream 30. Portion 30C is compressed and mixed with the $CO_2$-lean gas retentate stream 34 exiting the first $CO_2$-enricher 304. The $CO_2$-rich permeate stream 44 exiting the at least one additional $CO_2$-enricher 308 is compressed in compressor 310 and directed to mix with the portion 30A of the pretreated flowback process stream 30 (and a vapor stream 66 from a vapor liquid separator (VLS) 316, described presently) at J3 for further $CO_2$ enrichment in the first $CO_2$-enricher 304, repeating this cycle until the specific $CO_2$ criteria for the $CO_2$-rich permeate stream 32 is achieved.

A substantial portion of the $CO_2$ in the compressed $CO_2$-rich stream 40A is condensed into the liquid phase in the condenser 305. The advantage of conducting the condensation at a high pressure, such as 900 psig is that this condensation step may be achieved at >40° F. so that the practical liquid-leaving-temperature of the refrigeration system 306 is >20° F. By contrast, performing the same condensation at 350 psig would require the condensing temperature of approximately 0° F. which would entail a liquid-leaving-temperature of the refrigeration system 306 to be around −20° F. The refrigeration capacities of commercially-available trailer-mounted units decrease sharply as the liquid-leaving-temperature decreases. Thus, higher condensation temperatures entail lower capital equipment costs, lower footprint, and lower energy costs. The compressed $CO_2$-rich stream 40A is output from the condenser 305, as the captured $CO_2$-flow stream 35, and more specifically, as the Quality1 $CO_2$-output stream 38 if meeting specified criterion, or as Quality2 $CO_2$-output stream 36. In an embodiment (not shown), the captured $CO_2$-flow stream 35 exiting the condenser 305 as a mixed vapor/liquid stream may be sent directly to the purification zone 500, and more particularly the purifier 501, to yield the Quality1 $CO_2$-output stream 38 and the $CO_2$-lean distillate stream 52.

The condenser 305 may be operated to yield either total condensation of the compressed enriched $CO_2$-stream 40A or a partial condensation. To this extent, additional key processes may take place within the $CO_2$-capture zone 300 including, but not limited to, stabilization of the Quality1-output stream 38 via an optional post-condenser vapor-liquid separator (VLS) 316. A VLS would provide an opportunity to separate volatiles from the Quality1 $CO_2$-stream 38 exiting the condenser 305 at a high pressure (e.g. 900 psig). In an embodiment in which only partial condensation is achieved in condenser 305, the compressed enriched $CO_2$-stream 40A, exiting the condenser 305 as a vapor-liquid stream may undergo separation in the VLS to yield the Quality1 $CO_2$-stream 38 and a VLS vapor stream 66. The vapor stream 66 is directed via J4 to mix at J3 with portion 30A of the pretreated flowback stream 30 and the $CO_2$-rich permeate stream 44, exiting the at least one additional $CO_2$-enricher 308, for further $CO_2$ enrichment.

Thus, inclusion of the VLS would provide a means for removal of undesired volatiles from compressed enriched $CO_2$-stream 40A, especially as the $CO_2$ content in the flowback gas stream 62 decreases and the C1 or other volatile-component increases. Additional information regarding the inclusion of a VLS may be found in U.S. patent application Ser. No. 14/974,825, titled "Flowback Management and $CO_2$-Recovery System and Method of Use," which is filed simultaneously herewith and incorporated herein in its entirety.

If the Quality2 $CO_2$-stream 36 meets predetermined $CO_2$-product specifications, then it is isolated in the storage zone 700, as previously described. In a product-conditioning step, the state of the Quality2 $CO_2$-stream 36 may be further modified in a conditioner 704 to meet the $CO_2$-product specifications. For example, if the desired storage/transport conditions are 350 psig/−10° F. then the product-conditioning step may include pressure-reduction or increase, as necessary and further cooling via a refrigeration system 706, if necessary, to reduce volatilization during storage/transport/use due to ambient heat incursions into the one or more Quality1 $CO_2$-storage tanks 701 and/or during transfer to a reuse site. If the desired storage/transport conditions are >1,200 psig/ambient then this step may include a liquid pump (not shown) to raise the pressure and/or provide further cooling, as necessary. Alternatively, if the output stream from the VLS 316 meets predetermined $CO_2$-product specifications without the need for further processing, such as product-conditioning, pressure reduction or increase, it may be sent directly to the $CO_2$-transfer zone 600 (FIG. 1) to provide transfer as the Quality1 $CO_2$-product stream 58 for product end use.

In the illustrated embodiment, the vapor stream 66 may be split at J4 to further provide a portion 66B to the purification zone 500 for further processing. More particularly, portion 66B may be stored in a storage tank 504 so that the feed to the purifier 501 may be controlled and undergo volatization in a simple volatization step using heat and/or decreased pressure or preferably a distillation column as a purifier 501. The purifier 501 may be operated in a partial-condenser mode and thus the vapor exiting in a vapor stream 52 will be enriched in the volatiles, e.g. C1. The extent of $CO_2$-loss in this vapor will depend on the pressure and temperature conditions in the condenser 305. For example, at 350 psig/−20° F. condenser conditions may yield approximately 58% $CO_2$ in the vapor, whereas 900 psig/−20° F. condenser conditions may yield approximately 35% $CO_2$ in the vapor. Correspondingly, where a reboiler (not shown) is included within the purification zone 500, the reboiler conditions may depend on the extent of C1 stripping desired and the operating pressure. For example, for desired <1% C1, the reboiler temperatures may be approximately 6° F. and 75° F. for 350 psig and 900 psig, respectively. Alternatively, the $CO_2$-product specifications may define the end $CO_2$-product in terms of a bubble point specification at a certain pressure, e.g. 0° F. at 350 psig. In this case, the reboiler pressure and temperature conditions are modified in order to meet these requirements.

The purifier 501 operating conditions may also be chosen for optimal energy usage. For example, if the $CO_2$-product specifications desire the $CO_2$-product at 350 psig/−10° F. then it is optimal to run the purifier 501, and more particularly an included distillation column, at approximately 350 psig, however, if the desired product is at >1,200 psig then it is desirable to operate the column at higher pressure.

The output stream from the purifier 501, as the distillate vapor stream, and more particularly, the $CO_2$-lean distillate stream 52 may be sent for further $CO_2$-recovery in the $CO_2$-capture zone 300 via a heat exchanger 307 and mixed with portion 30C of the pretreated flowback stream 30 at J5. Alternatively, if the $CO_2$-lean distillate stream 52 is of low-value, it may be wasted as low-value waste streams (not shown) and sent to the flare 51. For energy efficiency, $CO_2$-lean distillate stream 52 may be expanded via the heat exchanger 307 utilizing Joule-Thomson (JT) cooling, that will cool the low-$CO_2$-lean distillate stream 52 and provide cooling of the compressed enriched $CO_2$-stream 40A prior to it reaching the condenser 305. Alternatively, the heat exchange may be with any of the other streams in the process, for example, the feed stream, and more particularly the Quality2 $CO_2$-stream 36, to the purification zone 500.

As best illustrated in FIG. 3, the $CO_2$-lean distillate stream 52 may be directed to the at least one additional $CO_2$-enricher 308 via the compressor 312. The advantage of directing the CO2-lean distillate stream 52 to the at least one additional additional $CO_2$-enricher 308 over the first $CO_2$-enricher 304, is that in the embodiment of FIG. 3, the $CO_2$-lean distillate stream 52 from the purifier 501 would dilute the feed stream, and more particularly the pretreated flowback process stream 30, to the first $CO_2$-enricher 304 (in terms of $CO_2$ concentration) if input into feed stream 30A. As illustrated, the $CO_2$-lean distillate stream 52 will mix with $CO_2$-lean gas retentate stream 34 from the first $CO_2$-enricher 304 (which is leaner in $CO_2$ relative to the mixed stream 30D entering the first $CO_2$-enricher 304). In the embodiment of FIG. 4, a mixed stream 35 fed to the at least one additional $CO_2$-enricher 308 yields the $CO_2$-rich stream 44, that is directed to the first $CO_2$-enricher 304 for further enrichment in the first $CO_2$-enricher 304, via the first compressor 302, and mixed with the feed stream, and more particularly, portion 30A of the pretreated flowback process stream 30.

Referring still to FIG. 3, as an example, the compressed enriched $CO_2$-stream 40A may be operated at 900 psig and the purifier 501 may be operated (due to optimal energy usage criteria) at 350 psig. The gas entering the $CO_2$-enricher 304, the compressor 302 and/or the at least one additional $CO_2$-enricher 308 may be conditioned to desired temperature that is optimal for membrane gas separator operation. In an embodiment, a polymeric membrane that is selectively permeable to $CO_2$ relative to the hydrocarbon gas components may be used in the first $CO_2$-enricher 304 and the at least one additional $CO_2$-enricher 308. Gas permeation occurs due to a partial pressure gradient for the components across the membrane. The use of such membrane results in the $CO_2$-rich permeate streams 32 and 44 that are enriched in $CO_2$ and the CO2-lean gas retentate (non-permeate) streams 34 and 46 that are depleted in $CO_2$. For example, typical $P_{feed}/P_{permeate}$ conditions are 900 psig/ 100 psig, 350 psig/30 psig, 1100 psig/350 psig. Higher pressure drops result in higher permeation rates and consequently less membrane area for the same $CO_2$-recovery. However, lower values of the permeate-side pressure $P_{permeate}$ also entail higher equipment and energy costs for the gas compressors 306 and 310 needed to increase the permeate gas pressure to that point. Other constraints may limit the choices of feed- and permeate-side pressures. For example, a constraint could be the maximum pressure difference between the feed-side and permeate-side of the membrane channel that is permissible from membrane stability considerations, for example burst pressure of the manufactured membrane. Another example could be the plasticization of the membrane material with increased pressure due to dissolved $CO_2$ or hydrocarbons that may limit $CO_2$-enrichment performance or membrane service-life.

In addition, due to the permeation process and loss of pressure of the permeating components, the temperature decreases inside the membrane module which may lead to condensation of higher-boiling components on the retentate side (higher P side) of the membrane. Polymeric materials suitable for this membrane separation include PEEK, cellulose acetate, and polyimides. The membrane may be in the form of hollow-fiber bundles or spiral-wound modules. However, because of potential condensation of the NGLs in the gas streams, use of membranes that will not be physically blocked by the condensed liquid are required. Hence, hollow fibers are more suited than spiral wound modules. In addition, membrane materials that are stable to liquid hydrocarbons are required. PEEK membranes characterized for NGLs condensation conditions have been found to be stable for these purposes. Additionally, the membrane modules may be mounted vertically to allow drainage of the condensed liquids, if any.

Referring more particularly to the $CO_2$-lean gas retentate (non-permeate) stream 46 output from the at least one additional $CO_2$-enricher 308 toward the gas cleanup zone 400, the $CO_2$-lean gas retentate stream 46 has a concentration that represents the extent of $CO_2$-recovery from the pretreated flowback process stream 30. While low values of % $CO_2$ entail higher $CO_2$-recovery into the $CO_2$-rich-permeate stream 44, this also represents a lower permeate $CO_2$-concentration (and higher C1-concentration) that lowers the $CO_2$-concentration of the compressed enriched $CO_2$-stream 40A entering the condenser 305. From a design perspective, requiring low values of $CO_2$ in the $CO_2$-lean gas retentate stream 46 entails need for a higher membrane area in the first $CO_2$-enricher 304 and the at least one additional $CO_2$-enricher 308. Thus, % $CO_2$ represents a process parameter that may be used as an optimizing parameter for the $CO_2$-capture process.

The point at which the $CO_2$-lean gas retentate stream 46 is output from the enricher 308 also represents the end of the $CO_2$-recovery section, and more particularly the $CO_2$-capture zone 300. The $CO_2$-lean gas retentate stream 46 from the enricher 308 is directed to the gas cleanup zone 400. In the gas cleanup zone 400, which may be serviced by commercially-available membrane processes, the permeate-side is typically operated at very low pressures, for example 5 to 30 psig, to output a gas stream, and more particularly a $CO_2$ rich-permeate stream 50 having a low amount of $CO_2$ and hence may be flared as a flare gas via the flare 51 or returned to $CO_2$ capture zone 300 via a flare gas compressor 210 for further processing. A retentate stream may be used as a fuel 54 for on-site power generation or as a pipeline-quality natural gas stream 48 (e.g. 2% to 5% $CO_2$ and <7 lbs/MMSCF $H_2O$).

Referring now to FIGS. 4-6, illustrated are alternate operational embodiments of the apparatus of FIG. 3, with indicated alternative flow paths dependent upon the concentration of $CO_2$ in the flowback stream 12. FIG. 4 illustrates the operation of the flow splitter 301 under a high percentage of $CO_2$ concentration in the pretreated flowback stream 30, such as greater than 80% $CO_2$ when the $CO_2$-lean gas retentate stream 34 is greater than 30% $CO_2$ concentration. As illustrated, the flowback splitter 301 provides for directing of the portion 30A to the first $CO_2$-enricher 304 via the compressor 302 for further $CO_2$ enrichment and the directing of the portion 30B that meets specified $CO_2$ concentration levels to the condenser 305. As illustrated, due to the high percentage concentration of $CO_2$ in the pretreated flowback stream 30, the flow splitter prevents any flow (as portion 30C) to the compressor 312, as previously described.

FIG. 5 illustrates the operation of the flow splitter 301 under a medium percentage of $CO_2$ concentration in the pretreated flowback stream 30, such as greater than 50-80% $CO_2$ when the $CO_2$-lean gas retentate stream 34 is greater than 30% $CO_2$ concentration. As illustrated, the flowback splitter 301 provides for directing of the portion 30A to the first $CO_2$-enricher 304 via the compressor 302 for further $CO_2$ enrichment and prevents the direction of any portion of the pretreated flowback stream 30 to the condenser 305 of the compressor 312. In this particular embodiment, all of the pretreated flowback stream 30 is directed for further enrichment in the first CO2-enricher 304.

FIG. 6 illustrates the operation of the flow splitter 301 under a low percentage of $CO_2$ concentration in the pretreated flowback stream 30, such as less than 50% $CO_2$ when the $CO_2$-lean gas retentate stream 34 is greater than 30% $CO_2$ concentration. As illustrated, the flowback splitter 301 provides for directing of the portion 30C to the compressor 312 and the at least one additional CO2 enricher 308, for initial enrichment. In an alternate embodiment (now shown), at least a portion of the flow 30C may be directed to the gas cleanup zone 400. As illustrated, due to the low percentage concentration of $CO_2$ in the pretreated flowback stream 30, the flow splitter prevents any flow (as portion 30A) to the first CO2-enricher 304 and the condenser 305 (as portion 30B).

Figure 8:
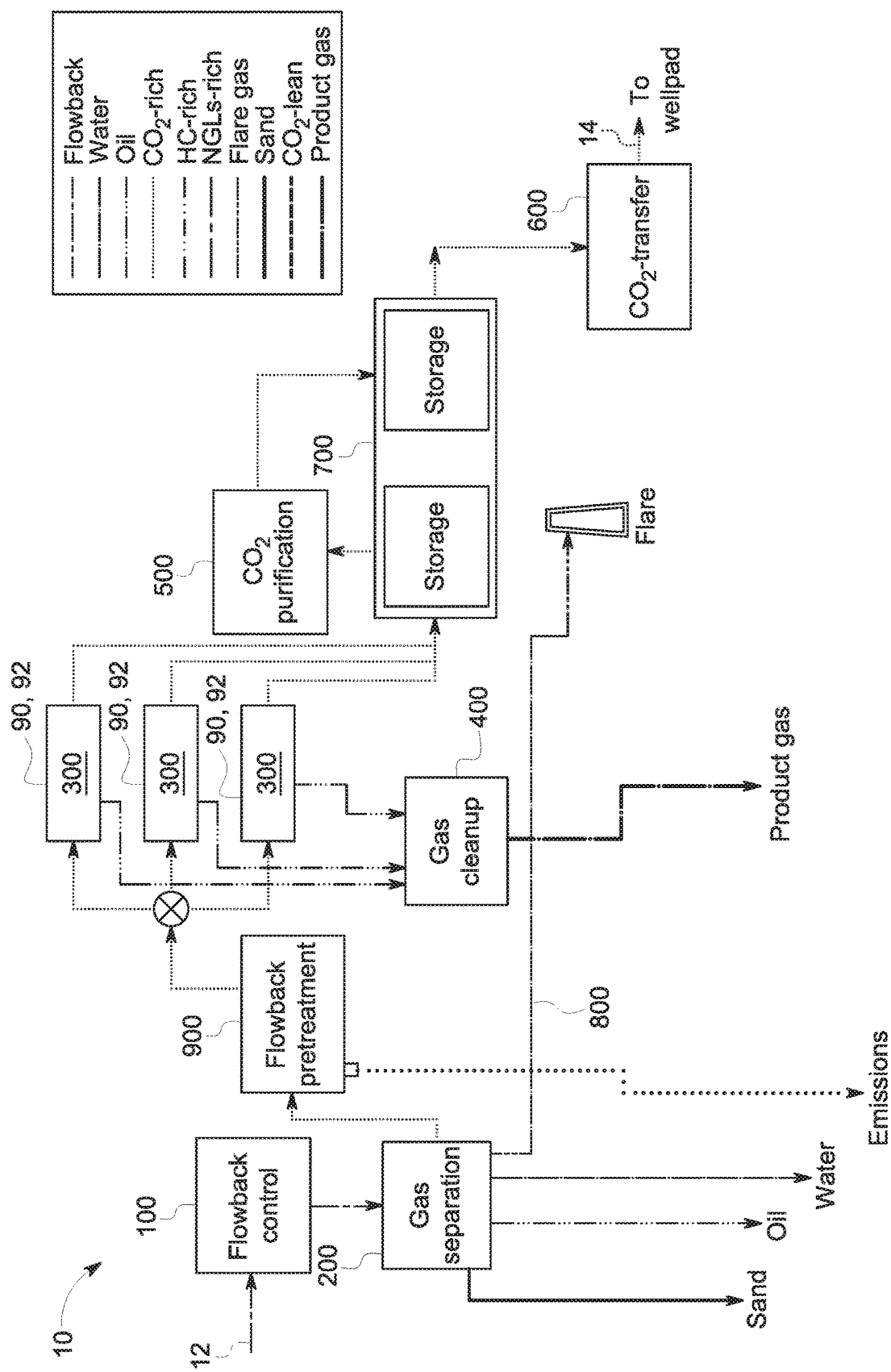
FIG. 8 is a detailed schematic diagram of a modified apparatus for the implementation of FIG. 3 including parallel $CO_2$-capture zones, in accordance with one or more embodiments shown or described herein.

In an alternate embodiment, as best illustrated in FIG. 8, the system employs the overall configuration of FIG. 1 and provides for replication of three $CO_2$-capture modules 90, each configured generally similar to a $CO_2$-capture zone 300, as described in FIGS. 3-6. Each of the $CO_2$-capture modules 90 are similar in scope, if not identical, so that the three modules 90 together will be able to service the entire flowback rate over the period of $CO_2$-recovery. In this embodiment, a feed compressor in the gas separation zone 200 may limit the flow handled by each module 90. In this example, each module 90 is designed to yield the Quality2 $CO_2$-stream 36. If this quality is sufficient for reuse then no further treatment is necessary. However, if a higher quality product is desired then it may be handled by the purifier 501. Each module 90 may be configured as a single skid 92 or a series of interconnected skids 92 designed such that each skid 92 is independently transportable, but easily connected and commissioned/decommissioned quickly at the well-site. Many choices are available as to what each module 90 will contain and may be dependent on costs, weight, ease of assembly/disassembly, operability and flexibility.

Accordingly, the disclosure herein provides a solution to capture $CO_2$ from a $CO_2$ containing hydrocarbon flow stream, such as a post $CO_2$-stimulation flowback stream, for reuse. Alternate flow streams using the flow management and $CO_2$ recovery system as disclosed herein for $CO_2$ recovery are anticipated. The focus of this disclosure is optimal recovery of $CO_2$ from the post $CO_2$-stimulation flowback for reuse in oil and gas operations, such as reuse in stimulation of another well or in enhanced oil recovery (EOR). Hence, considerations, in addition to product recovery, at desired specifications are equipment costs, footprint occupied at the wellpad, ease of commission/use/decommission, and emission compliance. The disclosed process and apparatus configurations, may not provide complete 100% $CO_2$-recovery, but are intended to provide $CO_2$-recovery at an optimal percentage that is also economically viable for the well under consideration.

Optimal recovery of $CO_2$ from the post $CO_2$-stimulation flowback stream is based on the amount of $CO_2$ recoverable at the well-site: The efficiency of the $CO_2$-recovery from the post $CO_2$-stimulation flowback stream decreases as the $CO_2$-concentration in the post $CO_2$-stimulation flowback stream decreases as well as the flowrate. From an economic perspective, there may be minimum amount of $CO_2$-captured that would be necessary to justify the OPEX costs (equipment depreciation cost or rental, labor, energy) associated with the capture. For example, while $CO_2$ in the post $CO_2$-stimulation flowback stream may be high for a period of time (e.g. days 1 to 3 as illustrated in FIG. 7 where the $CO_2$ in flowback exceeds 200 tons/day), there is a sharp decline beyond day 3 to approximately 120 tons/day. In this case, an optimal recovery condition may be to operate the recovery only until day 3. Conversely, the equipment required to capture the peak production may be too large from perspectives of cost, footprint or logistics for storage/transport of the recovered $CO_2$ from the well-site. For example, instead of designing an apparatus to capture a peak of 720 tons/day, the optimal recovery may involve either reducing the flowback rate of the post $CO_2$-stimulation flowback stream (by choking at valve V1 in the flowback control zone 100, if possible), providing intermediate storage at the peak of the post $CO_2$-stimulation flowback stream, or diverting an excess portion of the post $CO_2$-stimulation flowback stream to a flare, while designing the $CO_2$-recovery apparatus for a lower maximum rate of, for example, 600 tons/day. Thus, the optimal point depends both on the flowback rate of the post $CO_2$-stimulation flowback stream as well as the $CO_2$-concentration in the post $CO_2$-stimulation flowback stream.

Figure 9:
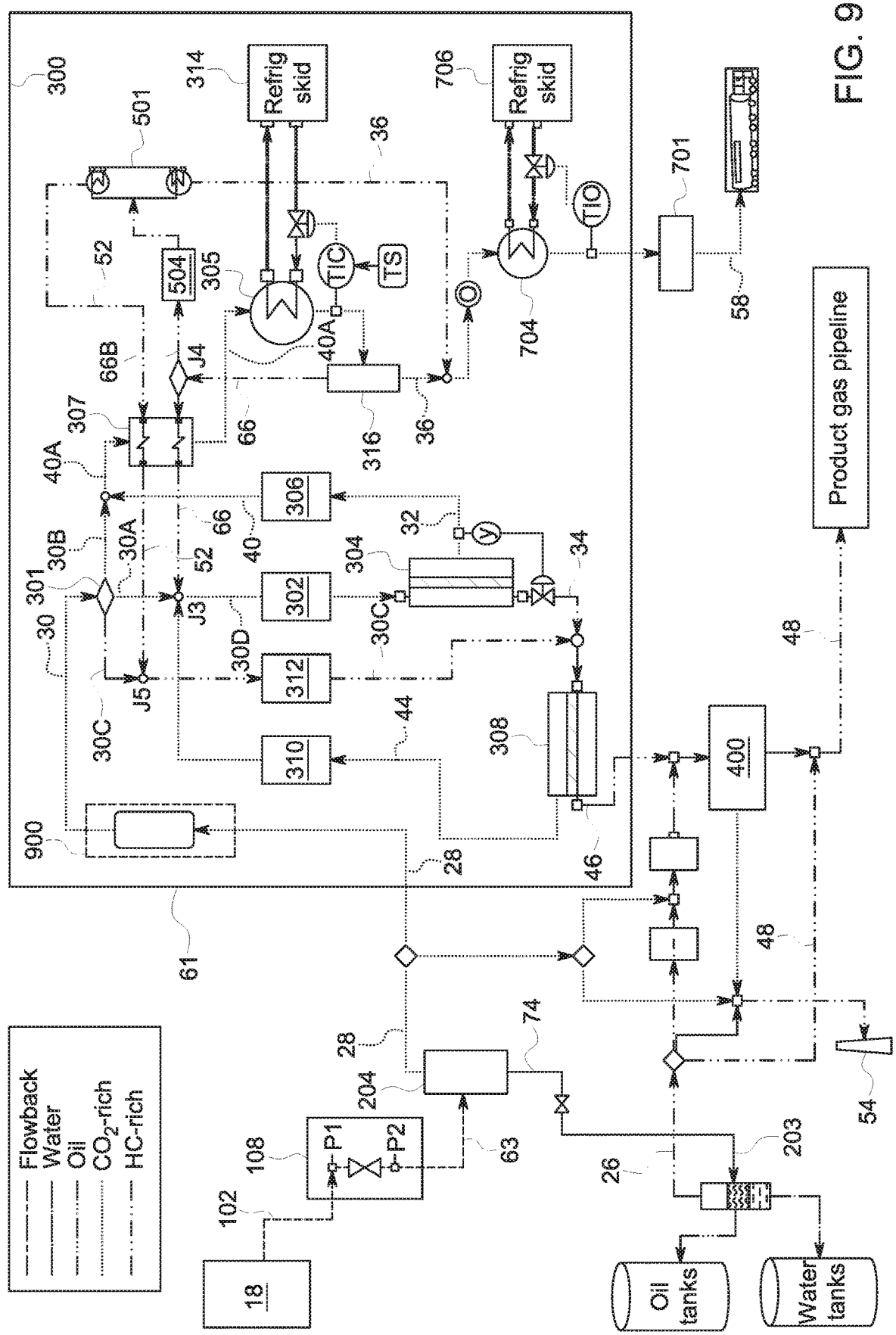
FIG. 9 is a further detailed schematic diagram illustrating an implementation of the apparatus for flowback management and $CO_2$-recovery of FIG. 3, in accordance with one or more embodiments shown or described herein.

It is anticipated that the process and apparatus configurations described in this disclosure may also be used with some modifications for the production phase of operations. For example, in FIG. 9, the process employs the configuration of the apparatus of FIG. 3 but configured for the production phase of operation. The modified flowback stream 63, whose pressure may be controlled via valve V1, is sent to a vapor liquid separator (VLS) 204. Since no or negligible amount of sand and no trash is anticipated during this production phase of operations in comparison to the flowback phase of operations, the VLS 204 may be a vertical vessel with a pressure regulator on top to regulate the pressure of the output flowback process stream 28 sent for $CO_2$-capture in $CO_2$-capture zone 300. A flowback stream 74 exiting the VLS 204 that contains oil, water and residual gas is sent to one or more low pressure gas separators 203 wherein the gas is separated from oil and water. If the $CO_2$ concentration in the output gas stream 26 is sufficiently low to meet gas pipeline specifications, then it may be directed to a gas pipeline as a pipeline quality natural gas stream 48. However, if the $CO_2$-concentration is higher than the pipeline specifications then it may be sent to the flare 51 as a flare gas or to the gas-cleanup zone 400.

It is anticipated that the various components of the apparatus may be built and delivered to the site on trailers so that the apparatus may be easily assembled, put into service and disassembled at end of the period of operation.

The flow management strategy as disclosed herein provides effective control of the $CO_2$-product purity within a desired range while optimizing the system for $CO_2$-recovery in terms of capital costs, operating costs, footprint and easy implementation at the well-site. As previously stated, in practice, the flowback from the well is highly dependent on the reservoir, the amount of $CO_2$ used for stimulation, the operating conditions during the $CO_2$-stimulation and the flowback conditions. In effect, the flowback rates and compositions will vary between wells and, as described previously, with time. The flowback management strategy disclosed herein provides a means to respond to the changes in the flowrate in order to control the $CO_2$-recovery process operating conditions to yield $CO_2$-purity within a desired range, while optimizing the $CO_2$-recovery on a continual basis during the flowback period or the production period.

The foregoing has described an apparatus and method of recovery of $CO_2$ from a post $CO_2$-stimulation flowback. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

The invention claimed is:

1. An apparatus for a flowback management and $CO_2$-recovery from a post $CO_2$-stimulation flowback stream comprising:
   a flow control zone in fluid communication with the post $CO_2$-stimulation flowback stream to provide control of a flowrate of the post $CO_2$-stimulation flowback stream and output a modified flowback stream;
   a gas separation zone in fluid communication with the modified flowback stream to provide separation of a gas from the modified flowback stream, and to output a flowback process stream, the gas separation zone including,
      a high pressure gas separator configured to separate a portion of the gas from the modified flowback stream and output a first gas stream to a high pressure compressor,
      a medium pressure gas separator configured to separate a portion of the gas from the modified flowback stream and output a second gas stream to a medium pressure compressor,
      a low pressure gas separator configured to separate a portion of the gas from the modified flowback stream and output at least a portion of a third gas stream for on-site power generation,
      the medium pressure compressor to compress the second gas stream,
      the high pressure compressor configured to:
         compress the first gas stream,
         receive the second gas stream after compression by the medium pressure compressor and compress the second gas stream;
   a pretreatment zone in fluid communication with the gas separation zone to provide removal of one or more of trace solids, aerogels, oil, hydrogen sulfides, water and non-gas liquids from the flowback process stream and output a pretreated flowback gas stream, wherein the pretreatment zone comprises a dehydrator configured to respond to target $CO_2$-stream specifications;
   a $CO_2$-capture zone in fluid communication with the pretreatment zone to provide $CO_2$-capture from the pretreated flowback gas stream and output a captured $CO_2$-flow stream, the $CO_2$-capture zone including a first $CO_2$-enricher and at least one additional membrane-based $CO_2$-enricher disposed downstream of and in cascading relationship with the first $CO_2$-enricher to provide a $CO_2$-rich permeate stream, the $CO_2$-capture zone further including at least one condenser to condense the enriched $CO_2$-stream and output the captured $CO_2$-flow stream;
   a $CO_2$-storage zone in fluid communication with the $CO_2$-capture zone;
   a $CO_2$-purification zone in fluid communication with the $CO_2$-capture zone; and a $CO_2$-transfer zone in fluid communication with the $CO_2$-storage zone to provide transfer of the captured $CO_2$-flow stream from the $CO_2$-storage zone as a $CO_2$-product stream for product end use, wherein the $CO_2$-storage zone is configured to store and control a flowrate of the captured $CO_2$-flow stream to the $CO_2$-purification zone and further store the $CO_2$ product stream exiting the $CO_2$-purification zone upstream of the $CO_2$-transfer zone.

2. The apparatus of claim 1, further comprising a gas cleanup zone in fluid communication with the at least one downstream $CO_2$-enricher to treat a portion of a $CO_2$-lean gas retentate stream and output a natural gas stream that meets gas pipeline quality specifications and a $CO_2$-rich permeate stream.

3. The apparatus of claim 1, wherein the pretreatment zone includes one or more of mechanical filters, coalescers, $H_2S$-scavengers, $H_2S$-selective membranes, H2O-selective membranes and dessicants.

4. The apparatus of claim 1, wherein the first $CO_2$-enricher and the condenser are operational to enrich and condense the pretreated flowback gas stream to meet the target $CO_2$-stream specifications at one or more locations in the apparatus, wherein the target $CO_2$-stream specifications are in one of $CO_2$-concentration or undesired components concentration in a respective flow stream.

5. The apparatus of claim 1, wherein the gas separation zone includes one or more gas separators providing varied operation in response to one or more of a flowrate and composition of the post $CO_2$-stimulation flowback stream.

6. The apparatus of claim 1, wherein the $CO_2$-purification zone employs at least one of a heater, a cooler, an expander, a distillation column.

7. The apparatus of claim 1, comprising a plurality of $CO_2$-capture zones configured in parallel such that the combined capacity satisfies an anticipated maximum flowrate of the post $CO_2$-stimulation flowback stream.

8. The apparatus of claim 1, wherein the low pressure gas separator outputs a remaining portion of the third gas stream to a low pressure compressor to compress the third gas stream which is then passed to the medium pressure compressor for further compression and then to the high pressure compressor for even further compression, and the compressed first gas stream, the compressed second gas stream and the compressed remaining portion of the third gas stream produce the flowback process stream.

* * * * *